US012603601B2

(12) United States Patent
Byrnes et al.

(10) Patent No.: US 12,603,601 B2
(45) Date of Patent: Apr. 14, 2026

(54) STORM RESISTANT MOUNTING METHODS FOR RENEWABLE ENERGY DEVICES

(71) Applicant: FSWM Technical Enterprises, Inc., Marietta, NY (US)

(72) Inventors: John T. Byrnes, Marietta, NY (US); Kevin J. Byrnes, Marietta, NY (US)

(73) Assignee: FSWM Technical Enterprises, Inc., Marietta, NY (US)

( * ) Notice: Subject to any disclaimer, the term of this patent is extended or adjusted under 35 U.S.C. 154(b) by 394 days.

(21) Appl. No.: 18/287,563

(22) PCT Filed: Mar. 23, 2021

(86) PCT No.: PCT/US2021/023672
§ 371 (c)(1),
(2) Date: Oct. 19, 2023

(87) PCT Pub. No.: WO2021/195075
PCT Pub. Date: Sep. 30, 2021

(65) Prior Publication Data
US 2024/0195343 A1 Jun. 13, 2024

Related U.S. Application Data

(60) Provisional application No. 63/001,075, filed on Mar. 27, 2020.

(51) Int. Cl.
*H02S 20/00* (2014.01)
*E06B 9/15* (2006.01)

(52) U.S. Cl.
CPC .............. *H02S 20/00* (2013.01); *E06B 9/15* (2013.01)

(58) Field of Classification Search
CPC .......... H02S 20/00; H02S 10/12; H02S 20/10; H02S 30/20; E06B 9/15;
(Continued)

(56) References Cited

U.S. PATENT DOCUMENTS

2010/0229916 A1* 9/2010 Bechamp ................ H02S 40/00
135/121
2015/0013750 A1* 1/2015 Meppelink .............. H02S 20/30
211/164

FOREIGN PATENT DOCUMENTS

CH 634630 A5 * 2/1983 ........... E06B 9/0638

OTHER PUBLICATIONS

CH-634630-A5 machine translation (Year: 1983).*

* cited by examiner

Primary Examiner — Angelo Trivisonno
(74) *Attorney, Agent, or Firm* — Bernhard P Molldrem, Jr.

(57) ABSTRACT

A Surface-affixed, Storm-Resistant Containment Unit involves a shelter structure, with internally-mounted photovoltaic solar panels, and movable doors which may be 'closed' to protect the photovoltaic solar panels from storm-related damage, e.g. hail, extreme wind and airborne debris. When weather conditions improve, the movable doors may be 'opened', allowing sunlight to strike the undamaged photovoltaic solar panels, and renewable energy production to resume. These Storm-Resistant Containment Units may be installed, and electrically connected in multiples to comprise a storm-resistant, commercially-sized, renewable power generating station (or 'Micro-Grid') for use in geographic areas prone to severe storms and hurricanes. Such storm-resistant, commercially-sized, power generation station may be advantageously applied at existing 'Brown-Field' industrial sites that have existing, unused electrical-grid infrastructure.

5 Claims, 22 Drawing Sheets

(58) Field of Classification Search
CPC ... F05B 2240/91521; F05B 2270/1077; Y02E
10/50; Y02E 10/72; Y02E 10/728; Y02P
80/20; F03D 13/20; F03D 9/007
See application file for complete search history.

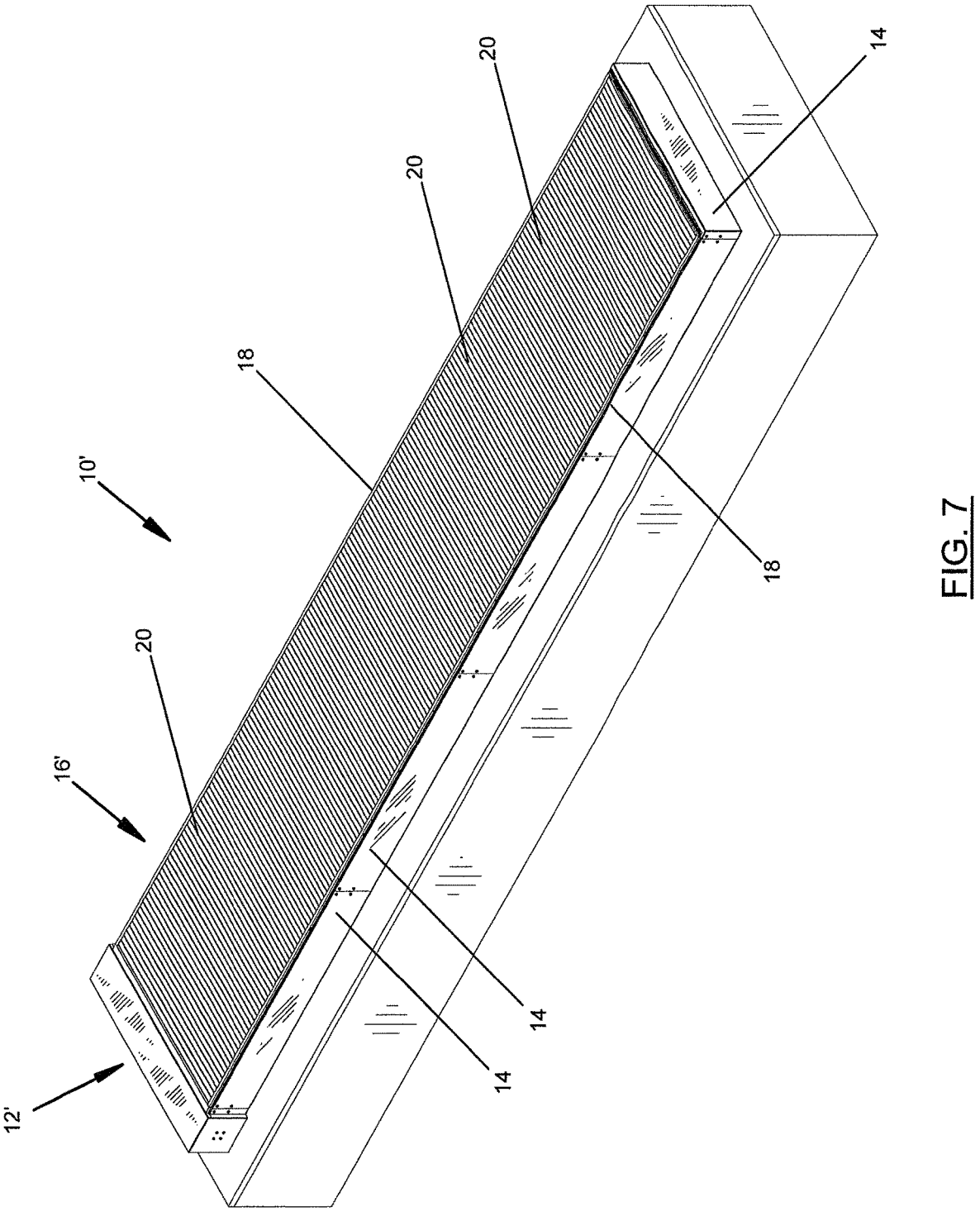
_FIG. 7_

STORM RESISTANT MOUNTING METHODS FOR RENEWABLE ENERGY DEVICES

Priority is claimed under 35 U.S.C. 119(e) of U.S. Provisional Application Ser. No. 63/001,075, filed Mar. 27, 2020. The disclosure thereof is incorporated by reference herein.

BACKGROUND OF INVENTION

The threat of a loss of electric power due to hurricanes or other storms, as well as the possibility of a loss of grid power, from accident, or deliberate attack on the power grid, has become much greater in recent years as dependency on utility-supplied electric power has grown. In many cases if a power generation or power substation goes offline for any reason it may take days, and up to you a number of weeks, to restore power to customers. Also, during extreme temperature conditions, the power draw for air conditioning or heating can create a power 'Brown-out' condition, where the power generation equipment cannot keep up with power demand. Consequently, the ability to provide backup electrical power during these events, and also to provide supplemental power during times of peak demand, is a definite requirement to assure day-to-day needs are met for both residential, and commercial, electricity supply. In particular, regions that are located within hurricane or tornado zones, and that also rely on remote Power producing facilities, are more likely to experience power outages due to power line failures.

Ideally, backup power can be supplied from closely-located, natural, renewable energy sources EG solar/photovoltaic (PV) panels, or wind turbines, because these local power sources, e.g. 'Micro-Grids', are generally considered to be nearly 'uninterruptable', especially when coupled with energy storage devices. However, there is significant evidence that the currently-available technologies used to Install and Mount renewable energy devices, do not provide any protection from extreme weather events. A pertinent example would be the destruction observed at the Industrial Solar Field located in Humacao, Puerto Rico on Sep. 20, 2017, and caused by Hurricane Maria. As a result of these types of events, far fewer renewable energy power generating stations are being installed in active tornado and hurricane zones.

The existing methodology to apply PV Solar Panels generally utilizes heavy-duty mounting poles and frameworks. The PV Solar Panels are permanently attached onto described mounting poles and frameworks, typically suspended above surrounding structures and surfaces (buildings, roof-tops and land surfaces).

The present/typical application method leaves the PV Solar Panels exposed during adverse weather conditions, which often leads to damage due to hail, excessive wind loads and airborne debris. As a result, Specifying Engineers and Architects are reluctant to apply Photovoltaic Energy Collection Systems in areas of the World that are prone to extreme weather conditions.

The proposed solution to this problem employs Installation and Mounting systems which utilize storm resistant containment units, e.g. enclosures, with movable door panels, capable of 'closing' to provide protection, for photovoltaic solar and wind energy generating systems, from severe weather conditions. After weather conditions are suitable, the movable doors may be reopened, exposing the photovoltaic solar panels to begin collecting energy, and also allowing the wind turbines to be raised from within their respective storm resistant containment units, and then resume wind energy collection.

The invention described herein applies containment units, with moveable protective covers, i.e., doors or panels, for the purpose of providing protection of the mounting hardware, and PV Solar Panels, from the damaging effects of extreme weather conditions (such as wind, hail and airborne debris). The inventors envision these containment units being permanently installed onto building rooftops, land surfaces (horizontally, or on angled hillsides to afford more optimal facing toward the Sun) and also Floating platforms. The inventors further envision pluralities of these Containment Units configured in Residential, Commercial or Industrial PV Solar Energy collection fields.

The moveable protective doors, or panels, of the described containment unit, may be actuated to a 'closed' position when extreme weather conditions are expected at the application site, causing a protective enclosure to be formed around the applied mounting hardware and PV Solar panels. Said moveable protective doors or panels, may be actuated to an 'open' position, after weather conditions improve; allowing sunlight to pass-through the open top of the containment unit and strike PV Solar panels, and enabling energy collection.

The moveable protective doors, or panels, may be constructed from extruded, or formed, 'slats' that are interlocking, pivoting, and flexible at the point of interlocking or pivoting, to allow the moveable door to be rolled into a coil shape (on a cylinder); or rotated (similar to a 'conveyor belt' shape). This cover arrangement of interconnected slats that travel in supporting rail guides is commonly known as a "tambour" closure, such as a roll-top closure.

Alternatively, pivoting solid (i.e., rigid) door panels may be applied in preference to moveable flexible doors. These solid door panels may be pivoted to an 'open' position; or to a 'closed' position.

This invention applies PV Solar panels in a fixed horizontal, or fixed angled, position within the containment unit. Alternate configurations may include a mechanism to pivot the PV Solar panels and mounting frames to a fixed position outside of, or into, the described containment unit/protective structure.

OBJECTS AND SUMMARY OF THE INVENTION

In the storm resistant containment unit, according to one embodiment of this invention, photovoltaic solar panels are arranged on mounting frames within the storm resistant containment unit which is secured to the ground or other rigid structures, through various secure attachment methods. The moveable door(s) of the storm resistant containment unit is/are capable of powered, and controlled, 'opening' or 'closing', either manually, or automatically, as weather conditions dictate. When the storm resistant containment unit is open during daylight hours and weather conditions are favorable, the photovoltaic solar panels are exposed to sunlight, facilitating energy collection. When weather conditions are not favorable, the moveable door(s) close, forming a protective enclosure around the photovoltaic solar panels, thereby protecting them from hail, extreme wind and airborne debris. In the Unit according to another embodiment of this invention, a wind turbine is attached to a powered, 'tilting' mast which is installed adjacent to the storm resistant containment unit. The wind turbine and 'tilting', or 'folding', mast are arranged such that by 'tilting', or 'folding' said mast to a horizontal position; the wind turbine is lowered into the storm resistant containment unit. The moveable door(s) then close(s), thereby forming a storm resistant 'enclosure' around the wind turbine, protecting it from hail, extreme wind or airborne debris. In this alternate embodiment, the storm resistant containment unit is opened when weather conditions are favorable; the powered, 'tilting' mast is 'raised' to a vertical position, exposing the wind turbine to the prevailing wind, subsequently facilitating energy collection. The two embodiments of these storm resistant containment units may be applied in pluralities to form the basis of a storm-resistant, commercially-sized, power generation station, e.g. a 'Micro-Grid'. The energy collected would ideally be added directly to a grid-connection point for distribution, OR the energy collected may be stored via existing energy storage technologies, facilitating uninterrupted electrical power supply to critical infrastructure, or for electric vehicle charging.

The principal object of this invention is to provide storm resistance to installed renewable energy collection systems, allowing these systems to be more readily applied within geographic regions that frequently experience severe weather, i.e. hurricanes, tornados and severe thunderstorms. Examples include the Island Territories of the United States, and the Southeastern/Gulf Coast/Midwestern regions of the United States.

Principal important features are as follows:

a. The storm resistant containment units, with movable tambour covers or hinged doors, enable both photovoltaic solar panel, and wind turbine, applications to be protected from damage associated with extreme weather, e.g. excessive wind, hail and airborne debris.

b. The movable doors may be rapidly closed, creating a storm resistant enclosure, for the internally mounted photovoltaic solar panels, or for wind turbines with powered, 'tilting', or 'folding', masts which have been lowered to the horizontal position such that the wind turbine mechanism is housed within the storm resistant containment units.

c. After weather conditions become suitable, the renewable energy systems, which have been 'protected' by the storm resistant containment units, will be returned to their 'open' positions, allowing renewable energy production to quickly resume.

d. The movable covers or doors of the storm resistant containment units may be controlled remotely from a Central Command location, as weather conditions dictate.

e. When photovoltaic solar panels, or wind turbines, are installed in conjunction with storm resistant containment units, and then arranged in pluralities, they may be electrically connected to form a 'Micro-Grid' which is 'hardened' against severe weather conditions. The energy collected from pluralities of these 'hardened Micro-Grids' may be; sent to large-scale Energy storage systems, Grid-connected, used to provide electricity to Critical Facilities, (e.g. Hospitals, Police/Fire stations, and Municipal Buildings), consumed by 'point of use' customers (e.g. adjacent Manufacturing facilities, EV Charging stations, etc.).

BRIEF DESCRIPTION OF DRAWING

The arrangement of this invention is shown in schematic form in the Drawing Figures.

FIG. 7 is a perspective view of a storm resistant containment unit, with a flexible slatted door in the 'closed' position, according to another embodiment of the invention.

DETAILED DESCRIPTION OF PREFERRED EMBODIMENT(S)

Figure 1:
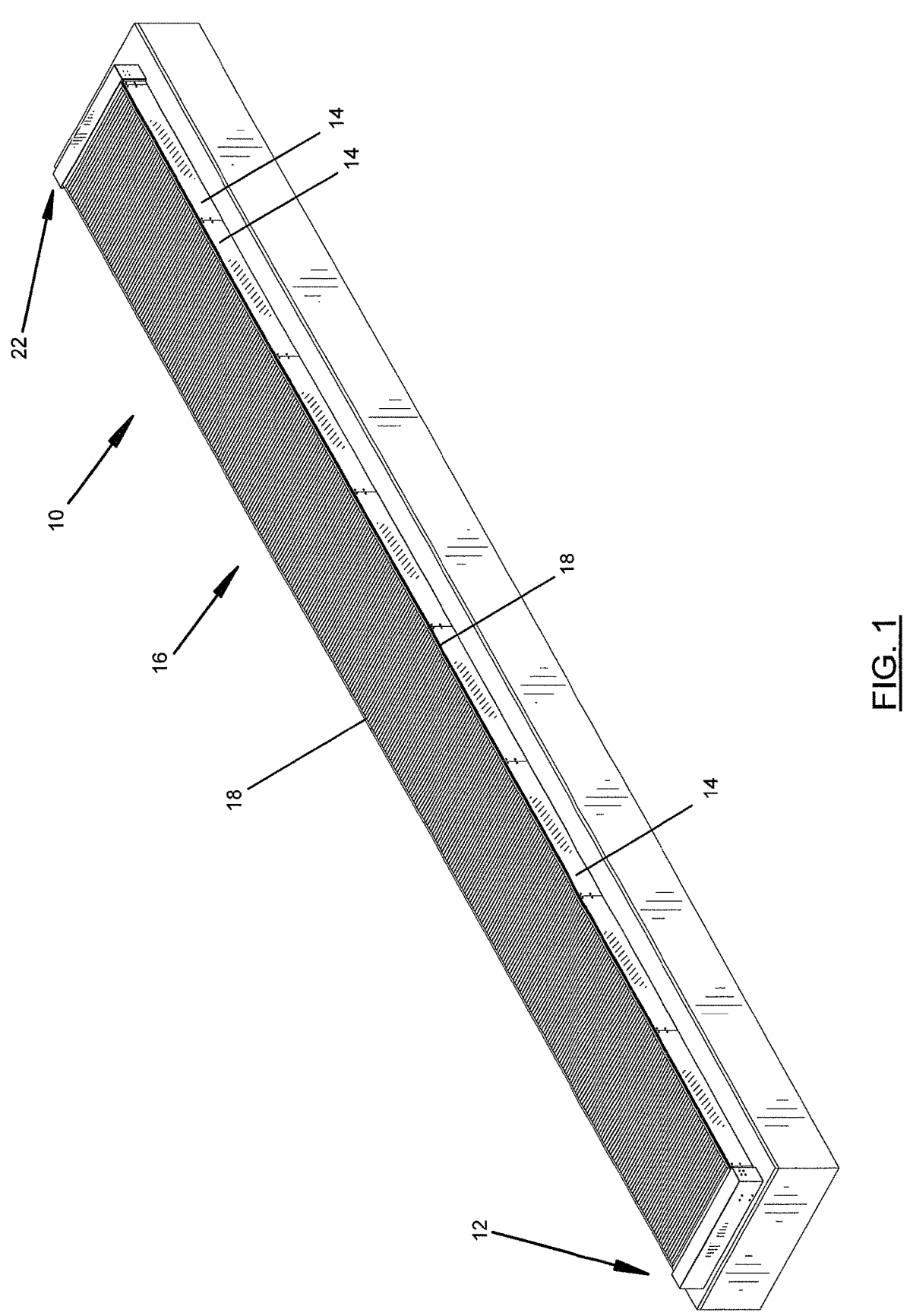
FIG. 1 is a perspective view of a storm resistant containment unit, with a movable, 'tracked' door (e.g., of a tambour configuration) in the 'closed' position, according to an embodiment of the invention.

With reference to the Drawing Figures, and initially to FIG. 1, in a perspective view a storm resistant containment unit 10 is installed or affixed to a section of land surface (or other solid structures). Here, an enclosed drive mechanism 12 is capable of positioning a movable, tracked door 16 that is constructed of a plurality of interlocking door slats 20, e.g., in a tambour door fashion, constrained, both laterally and vertically, by door tracks 18 on either side, with durable side panels 14, and an enclosed passive roller mechanism 22 for the interlocking door slats 20.

Figure 2:
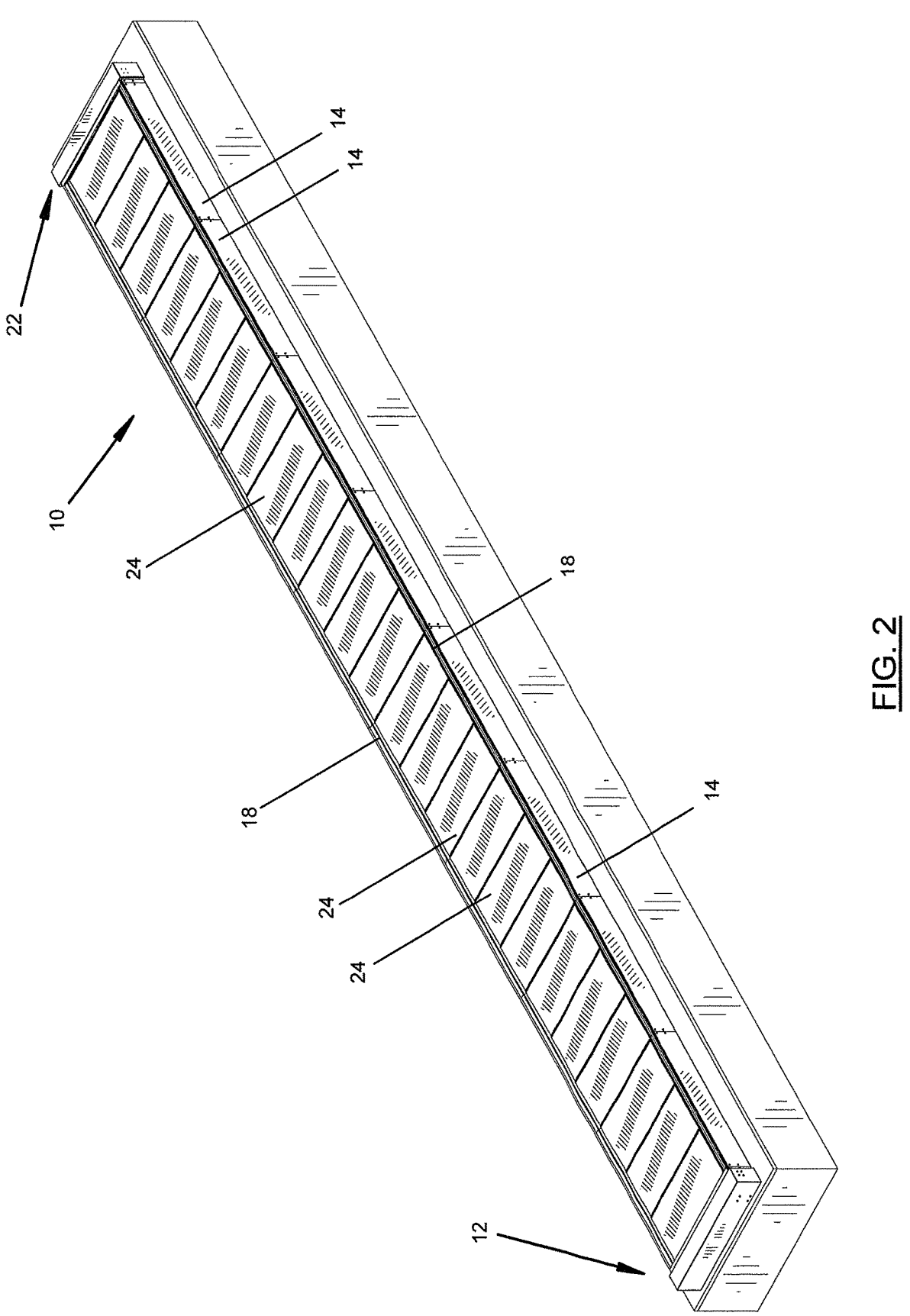
FIG. 2 is another perspective view thereof; here the movable door is in the 'open' position (hidden), revealing a plurality of photovoltaic solar panels installed within.

As depicted in FIG. 2, which is another perspective view thereof; the movable door 16 has been retracted (e.g. not visible) inside the storm resistant containment unit 10, revealing the plurality of solar or photovoltaic panels 24 which are mounted within the storm resistant containment unit 10, now fully exposed to sunlight, and collecting energy.

Figure 3:
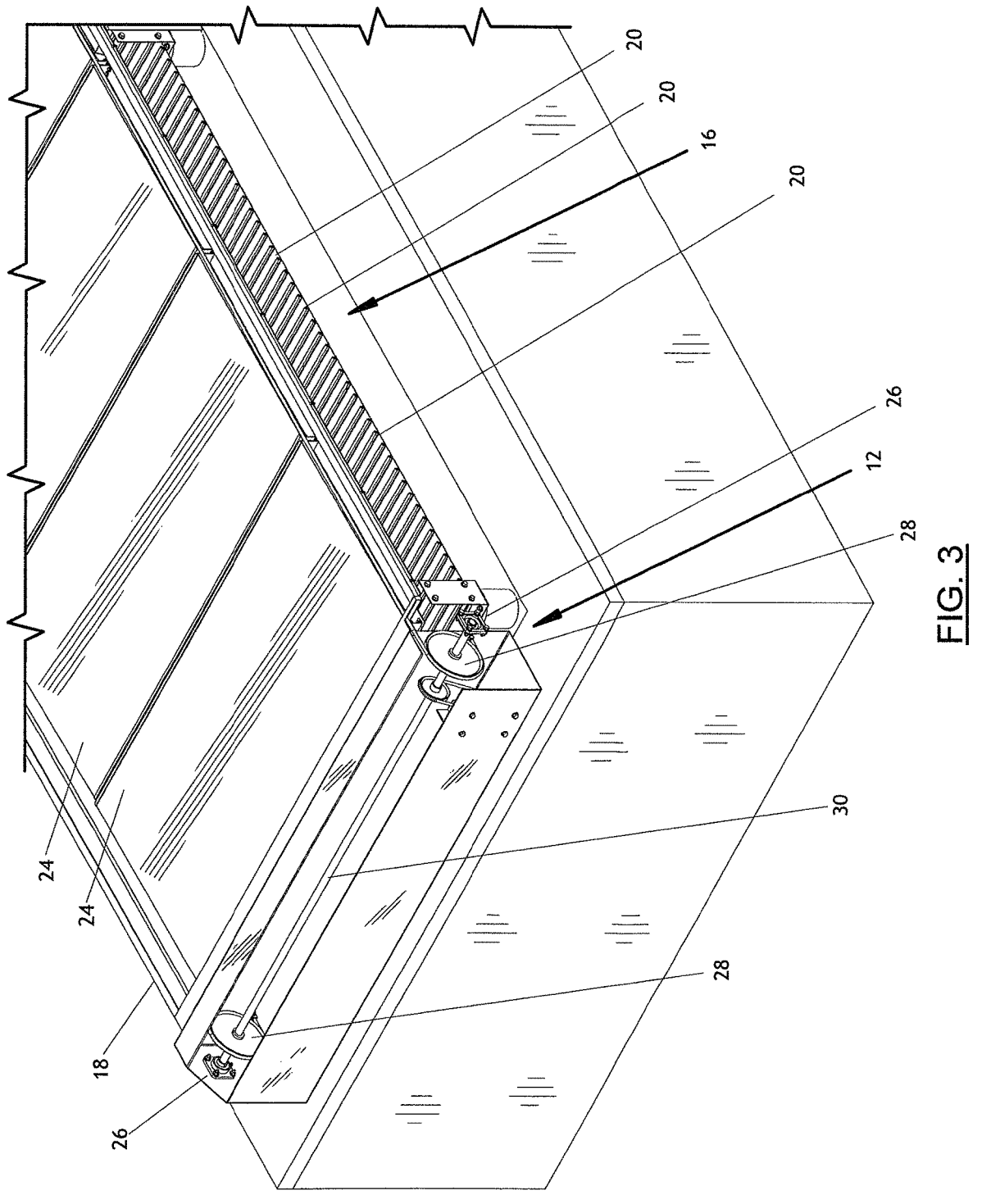
FIG. 3 is a partial perspective view thereof; here with the drive mechanism enclosure cut-away to reveal a drive shaft, a plurality of pulleys, and a drive belt, used to rotate the drive shaft, which is connected to the tensioning-cable pulleys. The movable tambour slat door, shaped similar to a conveyor belt, has been 'moved' and positioned completely beneath the solar or photovoltaic panels.

FIG. 3 is a partial perspective view thereof; here with one side panel 14 and one door track 18, removed, and the drive mechanism enclosure 12 cutaway, revealing two tensioning wheels 28, a drive shaft 30, two shaft bearings 26, a plurality of interlocking door slats 20, joined to comprise the movable door 16, in the fully retracted (e.g. open) position, with a plurality of solar or photovoltaic panels 24, mounted within.

Figure 4:
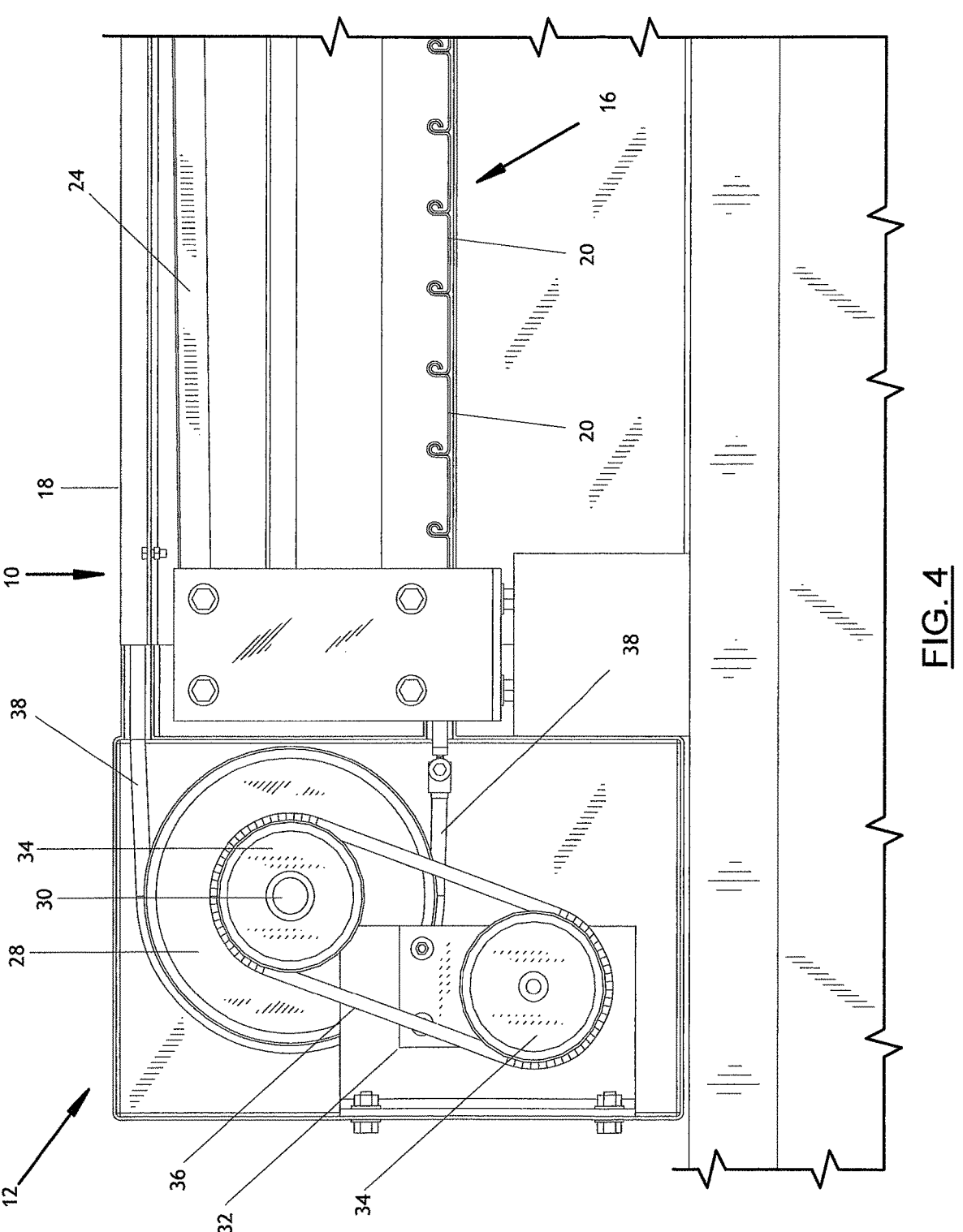
FIG. 4 is a partial side view thereof; here with the drive mechanism enclosure cut-away, and one side panel, the near side tensioning-cable pulley, and the nearest shaft bearing removed, revealing the drive mechanism, consisting of two drive pulley's, a drive belt, the far-side tensioning pulley, the tensioning cable, and a drive mechanism actuator. Also revealed is the movable door, which has been moved, (e.g. 'retracted'), to a position beneath the internally-mounted solar or PV photovoltaic panels.

FIG. 4 is a partial side plan view thereof; here with the drive mechanism enclosure 12 cutaway, and one side panel 14, one tensioning wheel 28, one tensioning cable 38, one shaft bearing 26 and one door track 18, all removed, to reveal a drive actuator 32, two drive pulleys 34, a drive belt 36, the far side tensioning wheel 28, the far side tensioning cable 38, a solar or photovoltaic panel 24 and the movable door 16 (in the retracted position) comprised of the plurality of interlocking door slats 20.

Figure 5:
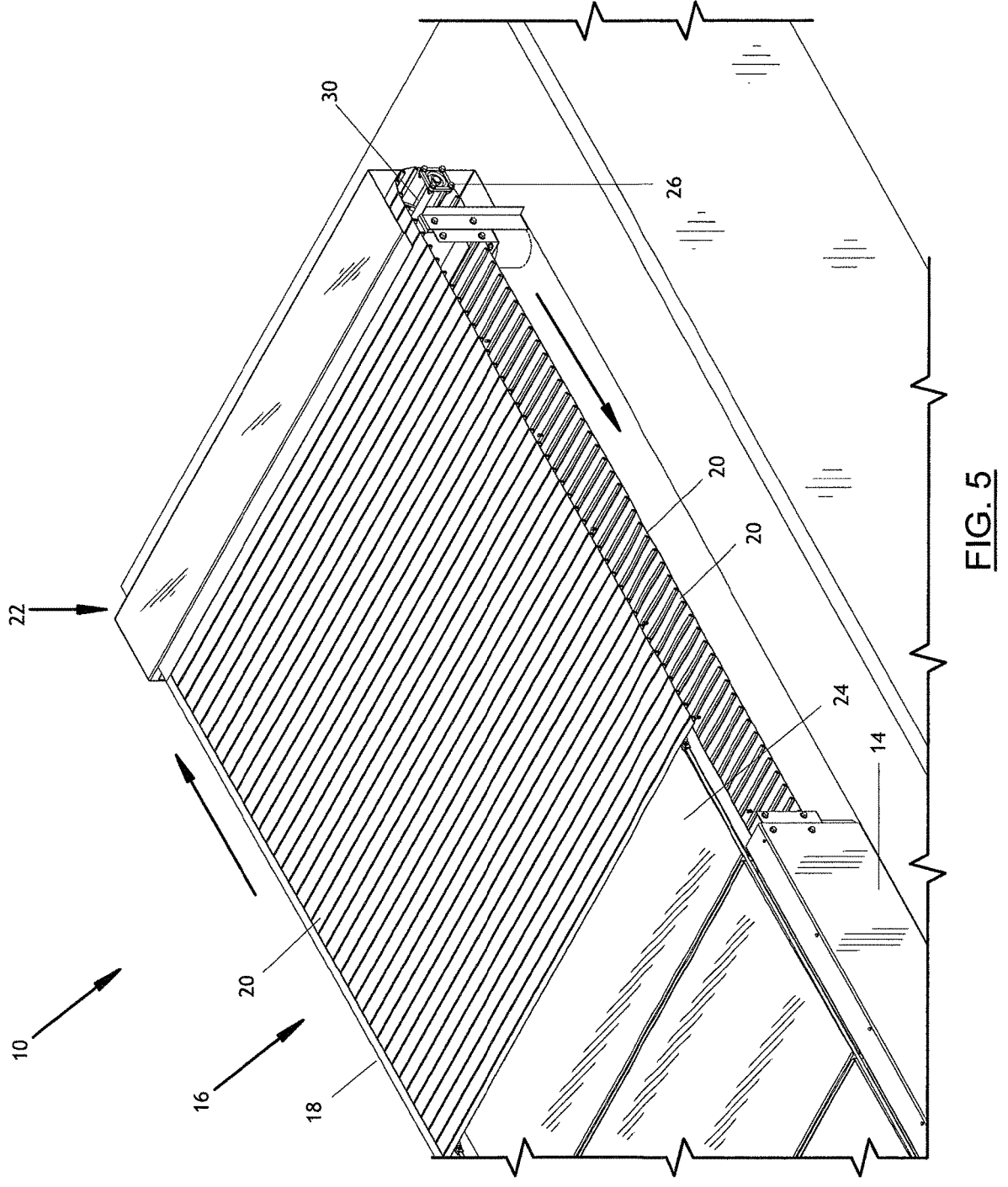
FIG. 5 is a partial perspective view thereof; here with one side panel removed, and the passive roller enclosure cut-away, to reveal the movable door, as positioned when being retracted (e.g. 'opened'), or deployed (e.g. 'closed').

FIG. 5 is a partial perspective view thereof; here with the passive roller mechanism enclosure 22 cut away, and one side panel 14 and one door track 18 removed, revealing a partly retracted movable door 16, a shaft bearing 26, a drive shaft 30 and a plurality of solar or photovoltaic panels 24.

Figure 6:
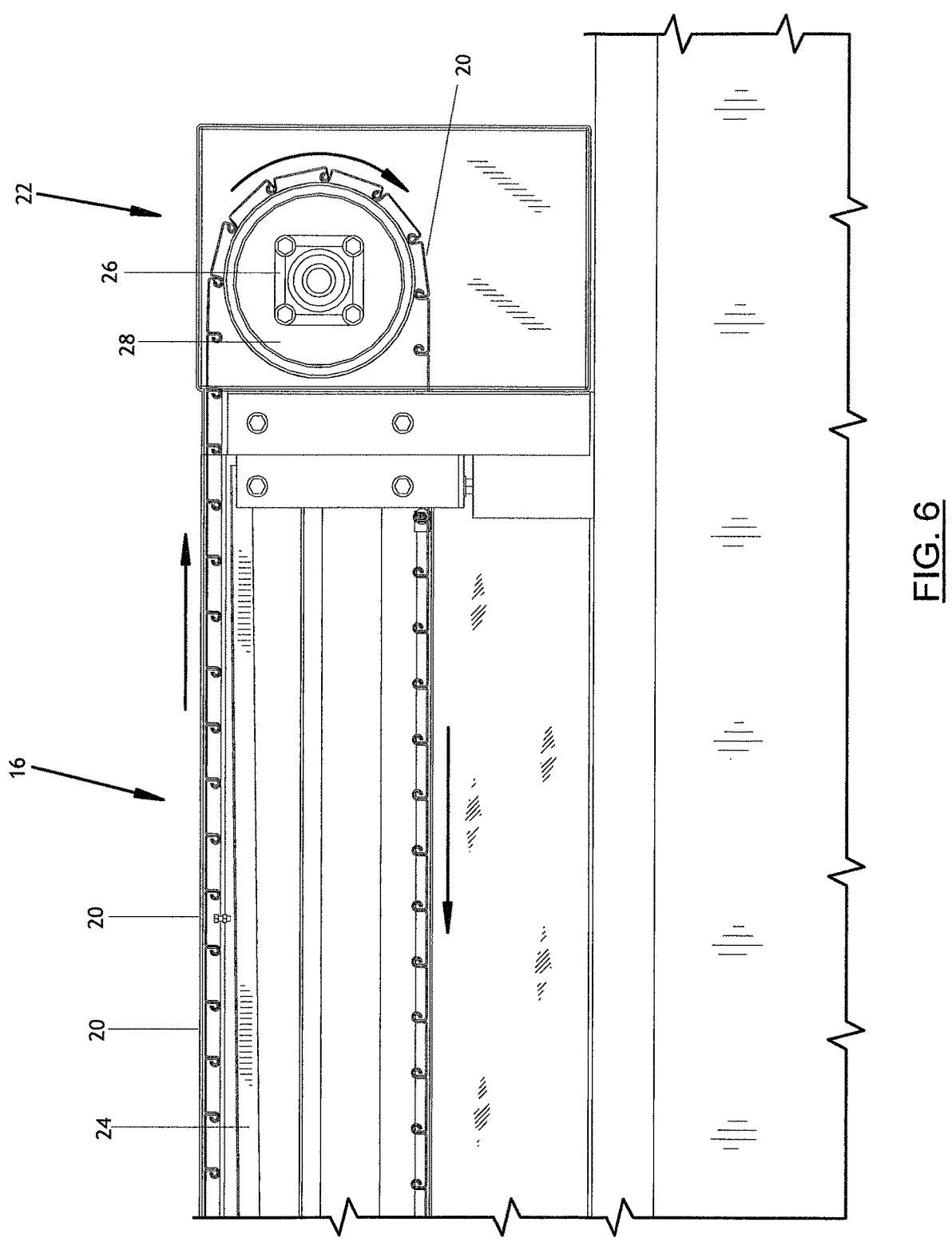
FIG. 6 is a partial side view thereof; here with the passive roller enclosure cut-away, and one side panel removed, revealing a bearing, a passive roller wheel, a solar or photovoltaic PV panel and the movable door in the process of being moved.

FIG. 6 is a partial side plan view thereof; here cutaway to reveal the plurality of interlocking door slats 20 configured to form the movable door 16 in the process of being moved between closed and open positions, a shaft bearing 26, a roller wheel 28, and a solar or photovoltaic panel 24 positioned beneath the partially-retracted movable door 16.

FIG. 7 is a perspective view of an alternative embodiment of the storm resistant containment unit 10', here showing the drive mechanism enclosure 12', a plurality of interlocking door slats 20 joined together to form the movable door 16', a plurality of side panels 14, and the door tracks 18, according to another embodiment of the invention.

Figure 8:
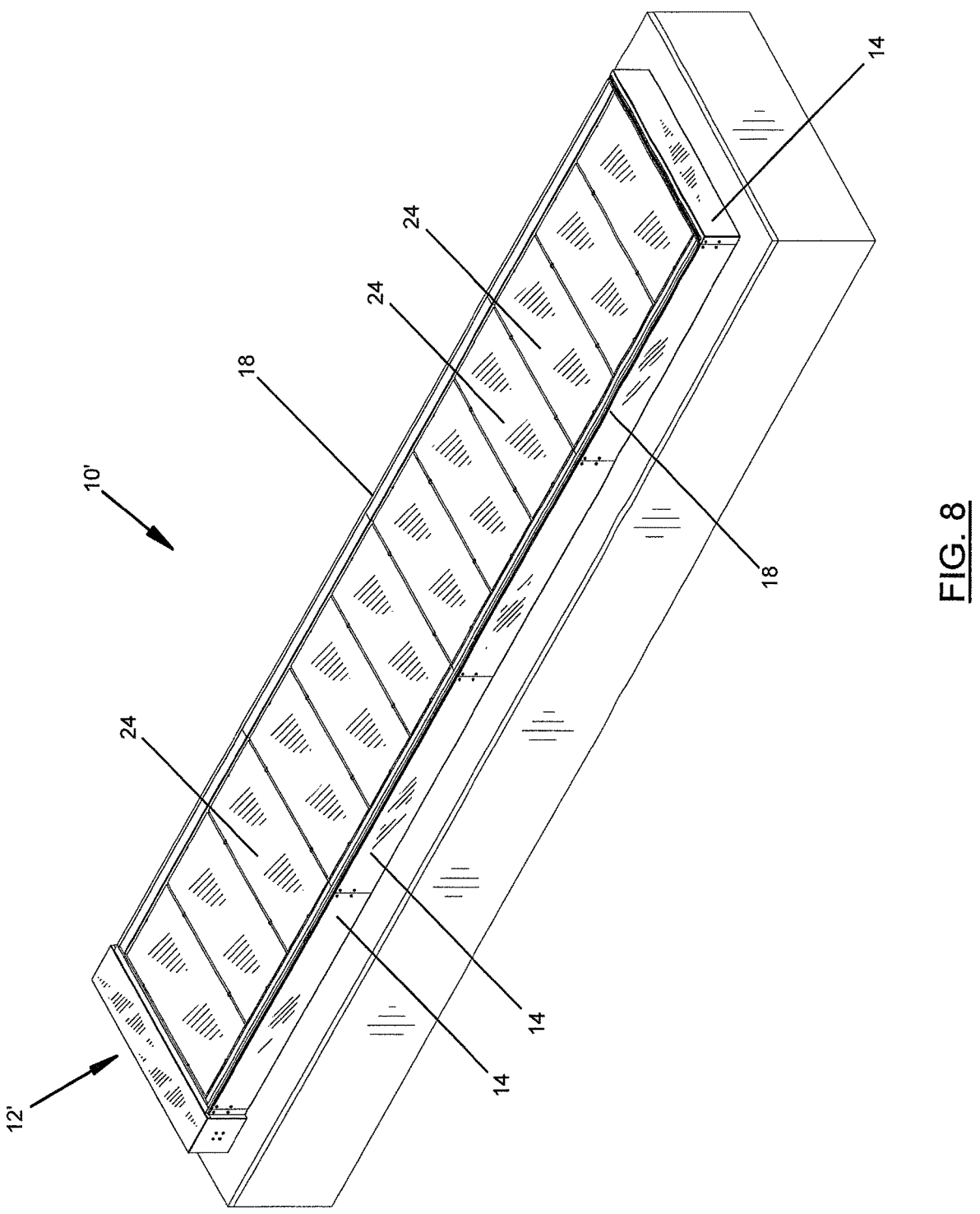
FIG. 8 is another perspective view thereof; here the movable door has been wound (e.g. coiled), within the drive mechanism enclosure, upon a rotary roller drum (e.g. cylinder), exposing the plurality of solar or photovoltaic PV panels to sunlight, and now collecting energy.

FIG. 8 is another perspective view thereof; here the movable door 16' has been coiled onto a rotary roller cylinder (e.g. drum) 28, within the drive mechanism enclosure 12' (i.e. not visible), and revealing a plurality of the solar or photovoltaic panels 24.

Figure 9:
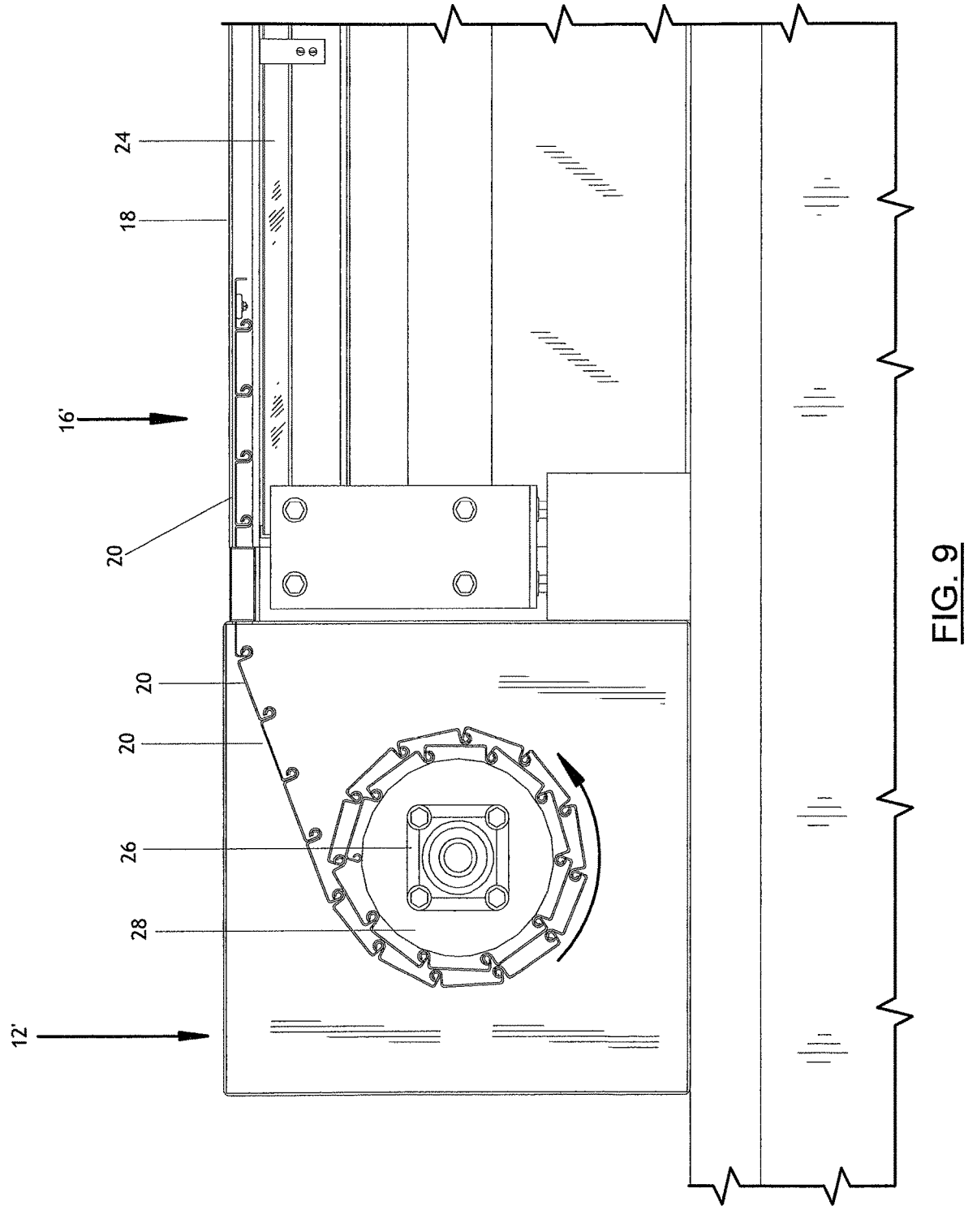
FIG. 9 is a partial side plan view thereof; here with the drive mechanism enclosure cut-away, and one side panel removed to reveal a shaft bearing, a movable door, composed of interlocking, or hinged door slats, being 'wound' onto a bearing-supported rotary roller cylinder.

FIG. 9 is a partial side plan view thereof; here with a side panel 14, and a door track 18, removed and the drive mechanism enclosure 12' is cutaway, to reveal a solar or photovoltaic panel 24, a shaft bearing 26, a plurality of interlocking door slats 20, joined to form a movable door 16', which is in the process of being coiled (e.g. wound) upon the rotary roller cylinder, i.e., spool or windlass 28.

Figure 10:
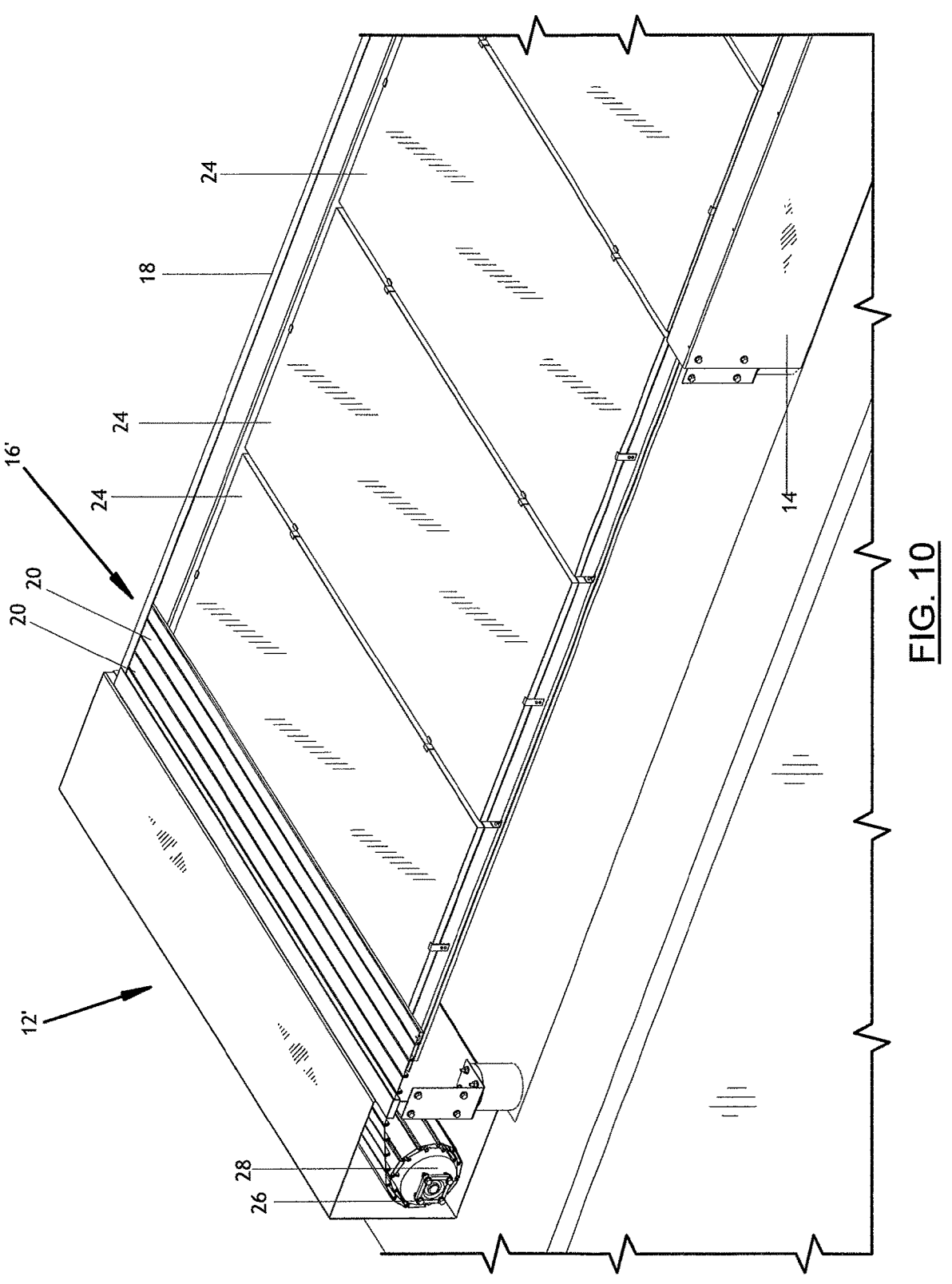
FIG. 10 is a perspective view thereof; here with the drive mechanism enclosure cut-away, and one side panel removed, to reveal a shaft bearing, a rotary roller drum, a movable door being wound onto a cylinder and with solar or PV panels installed beneath.

FIG. 10 is a partial perspective view thereof; here with the drive mechanism enclosure 12' cut-away, and with one side panel 14 and one door track 18 removed, to reveal a plurality of solar or photovoltaic panels 24, a shaft bearing 26, which supports the rotary roller cylinder 28. Also shown is the opposite-side door track 18, which is used to laterally, and vertically, constrain the movable door 16', which is in the process of being coiled onto the rotary roller cylinder 28.

Figure 11:
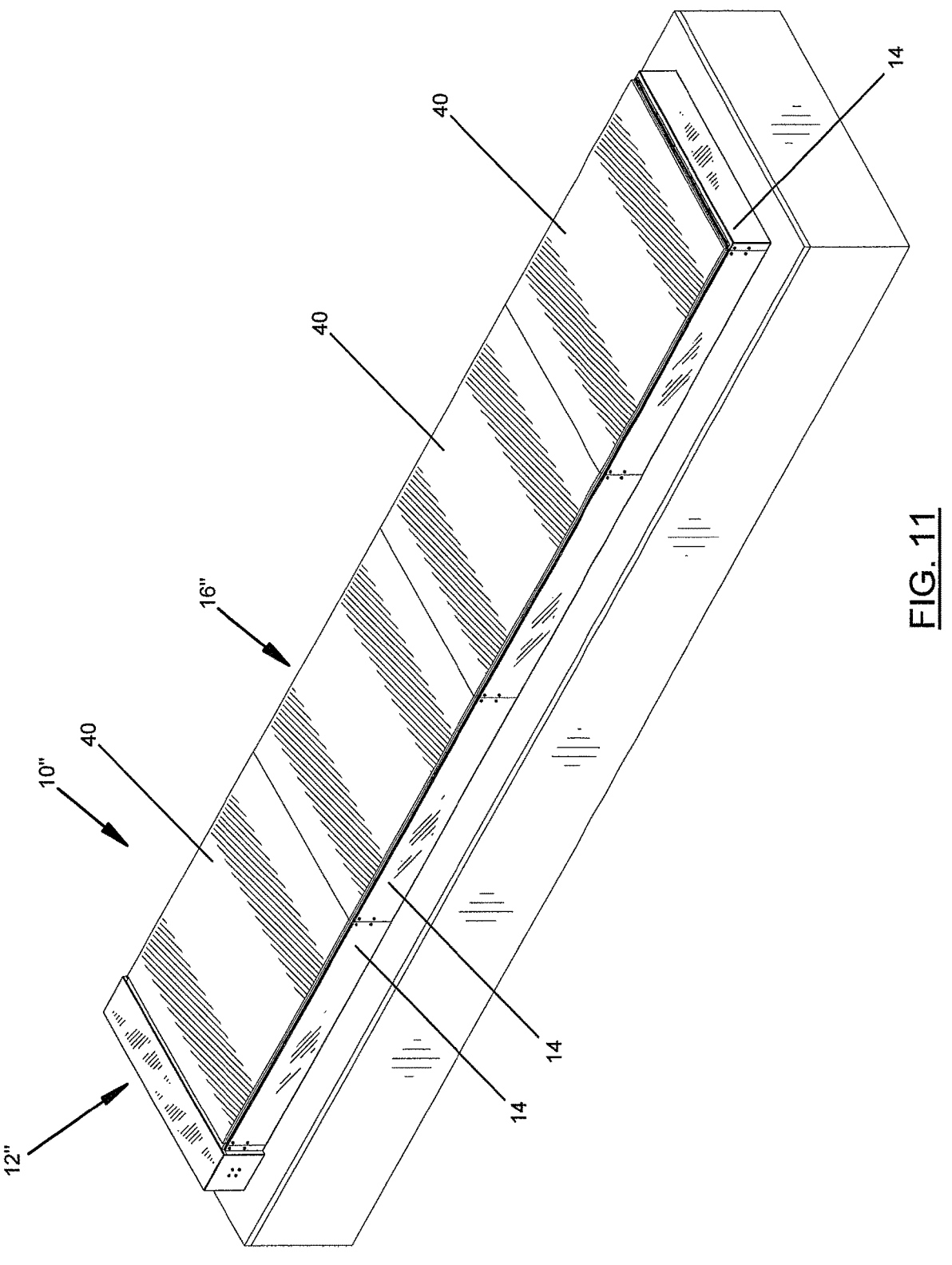
FIG. 11 is a perspective view, here with solid panel doors capable of pivoting along one edge, according to another embodiment of the invention.

FIG. 11 is a perspective view of a further embodiment of the storm resistant containment unit 10" of this invention, here showing a movable door 16", constructed of a plurality of pivoting solid door panels 40. Here, the movable door 16" is shown in the closed position.

Figure 12:
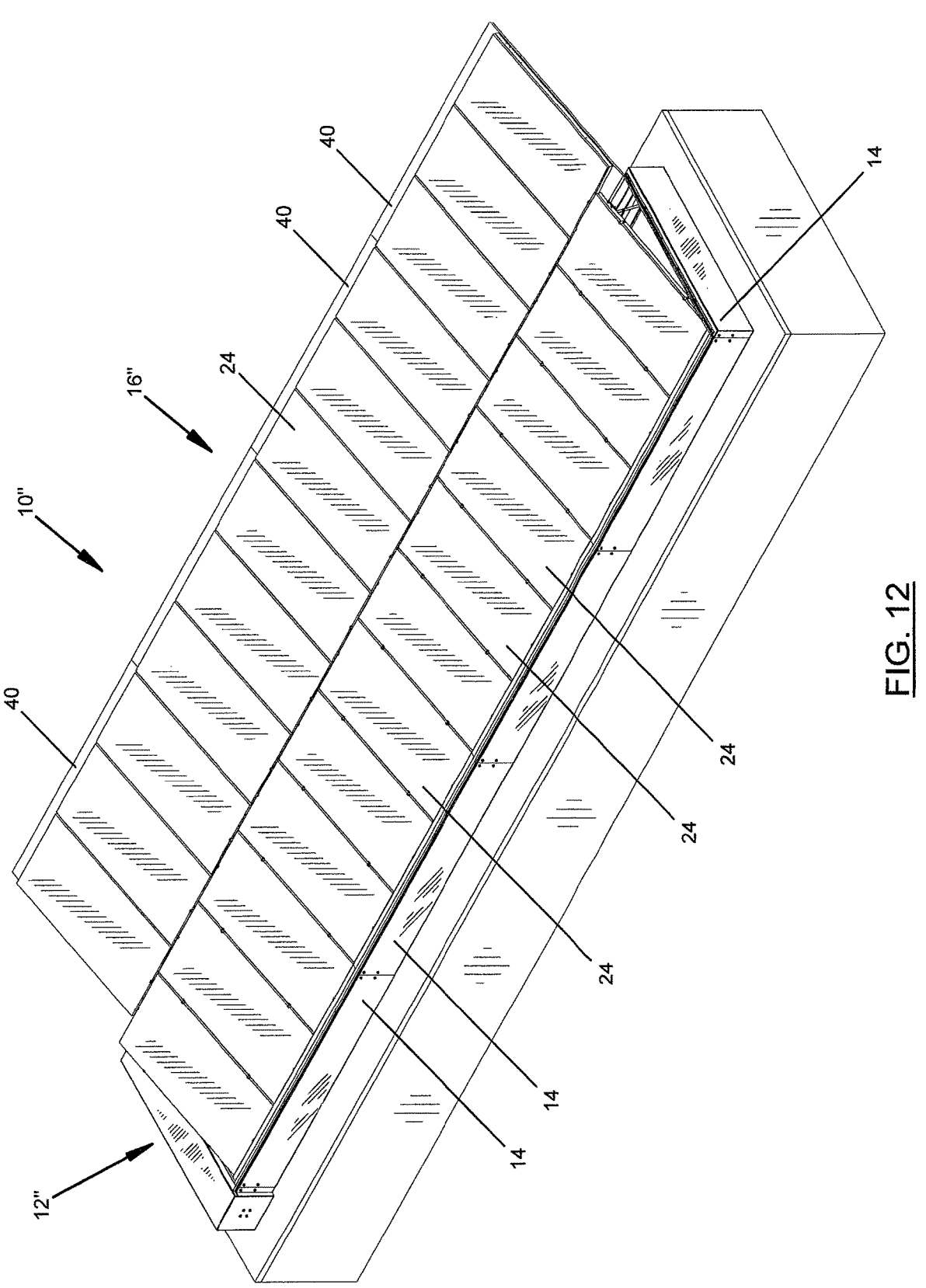
FIG. 12 is another perspective view thereof; here with the solid panel doors 'pivoted' to the 'open' position, revealing the internally mounted solar or photovoltaic panels.

FIG. 12 is another perspective view thereof; here illustrating the storm resistant containment unit 10", with its pivoting solid-panel doors 40 moved to the 'open' position, revealing the plurality of internally-mounted solar or photovoltaic panels 24.

Figures 13, 14:
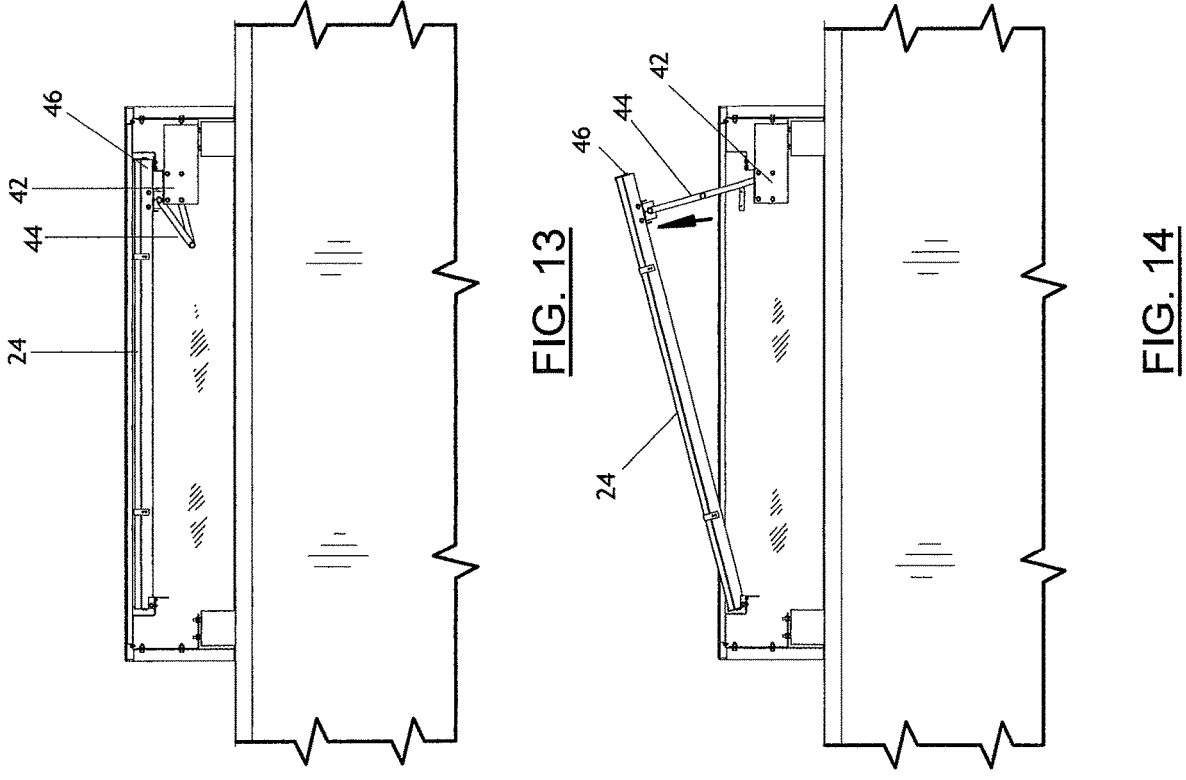
FIG. 13 is a partial end plan view thereof; here with the solid panel doors and a side panel removed, revealing a drive actuator and a linkage that controls the position of the hinged, solar panel mounting frame, with attached solar or photovoltaic panels, prior to being raised (e.g. 'deployed').
FIG. 14 is another partial end plan view thereof; here again with the solid panel doors and a side panel removed, revealing the frame-mounted solar or photovoltaic panels in the raised (e.g. 'deployed') position.

FIG. 13 is a partial end plan view thereof; here with one side panel 14 and the pivoting solid panel doors 40 removed, to reveal a positioning actuator 42, a linkage 44, connected to a hinged mounting frame 46, with solar or photovoltaic panels 24 attached. Here the solar or photovoltaic panels 24, and the hinged mounting frame 46, are shown in the retracted position.

FIG. 14 is another partial end plan view thereof; here with the one side panel 14 and the pivoting solid panel doors 40 removed, to reveal a positioning actuator 42, a linkage 44, connected to a hinged mounting frame 46, with solar or photovoltaic panels 24 attached. Here the solar or photovoltaic panels 24, and the hinged mounting frame 46, are shown in the deployed position.

Figure 15:
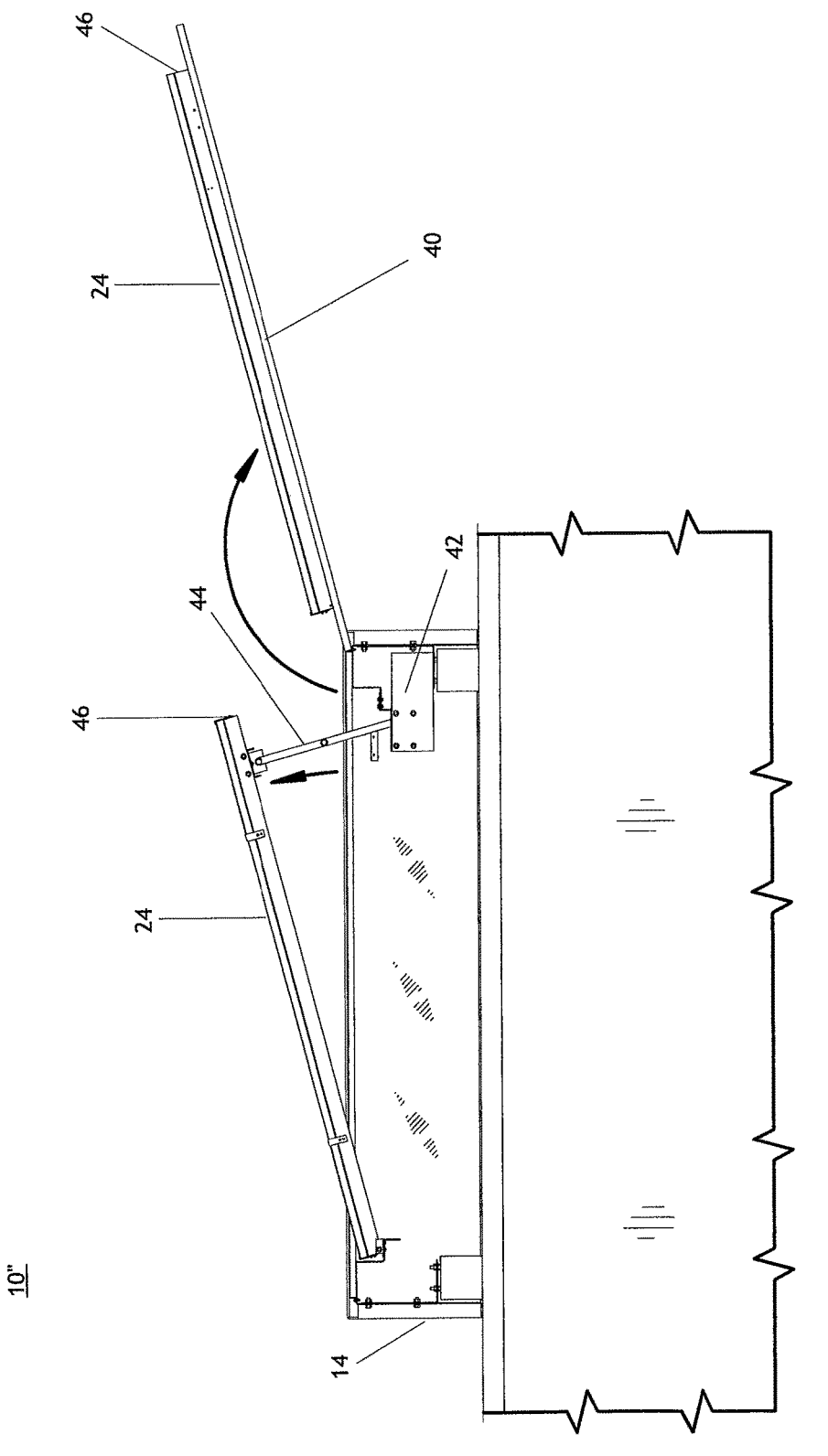
FIG. 15 is another partial end plan view thereof; here with one side panel removed and the solid panel doors, shown, and pivoted, to the open position.

FIG. 15 is another partial end plan view thereof; here with one side panel 14 removed, detailing the pivoting solid panel doors 40, pivoted to the open position, and a plurality of solar or photovoltaic panels 24, now collecting energy.

Figure 16:
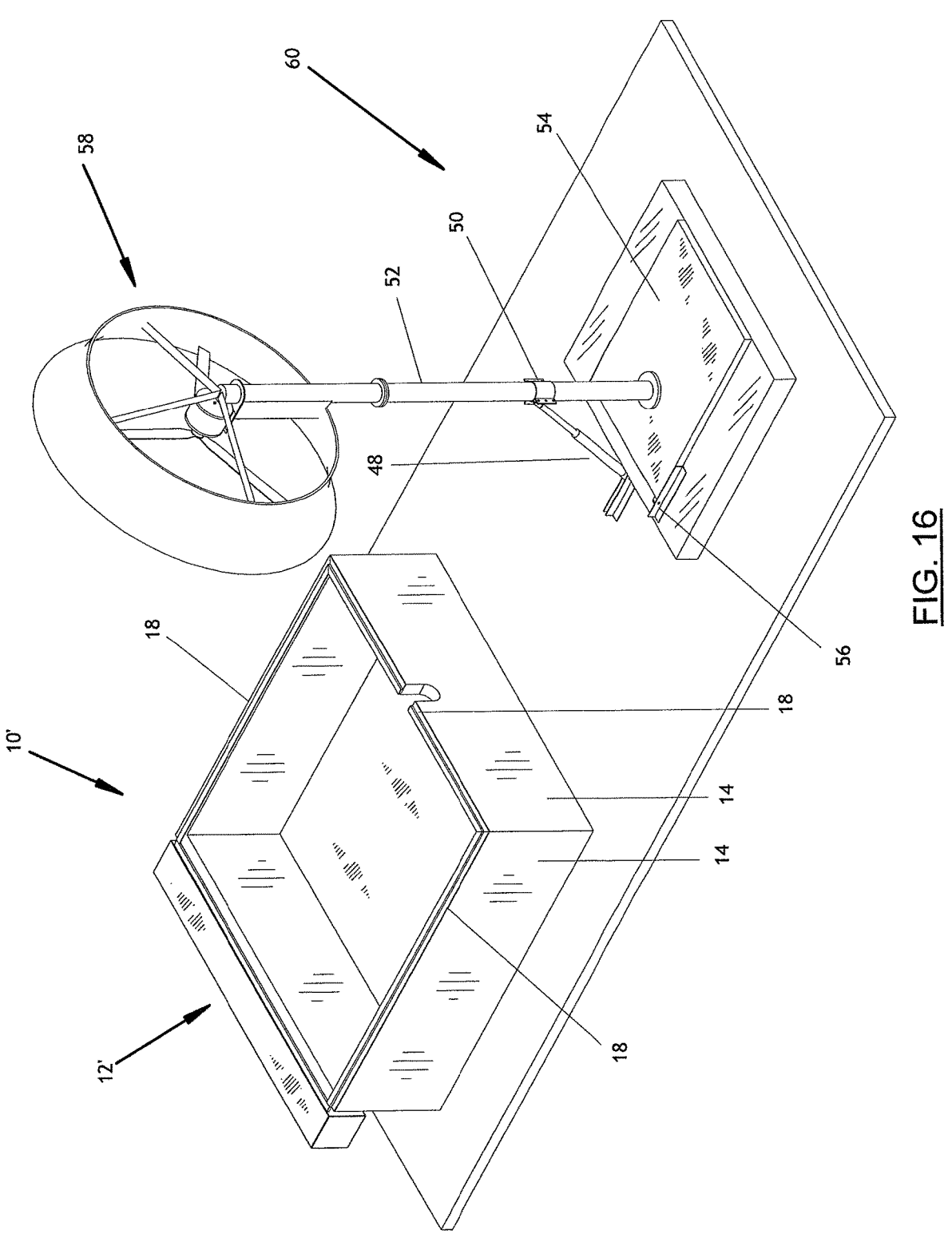
FIG. 16 is a perspective view of a storm resistant containment unit, here with a wind turbine, utilizing a linear actuator, and a tilting, or folding, mast assembly, in a deployed position, according to another embodiment of the invention.

FIG. 16 is a perspective view, here detailing a storm-resistant containment unit 10', with a drive mechanism enclosure 12', side panels 14, and door tracks 18. Also detailed is a wind turbine 58, mounted on a tilting, or folding, mast assembly 60, consisting of a linear positioning actuator 48, an actuator connection collar 50, a mast 52, a tilting mast platform 54, which is pinned at a hinge member 56, according to another embodiment of the invention.

Figure 17:
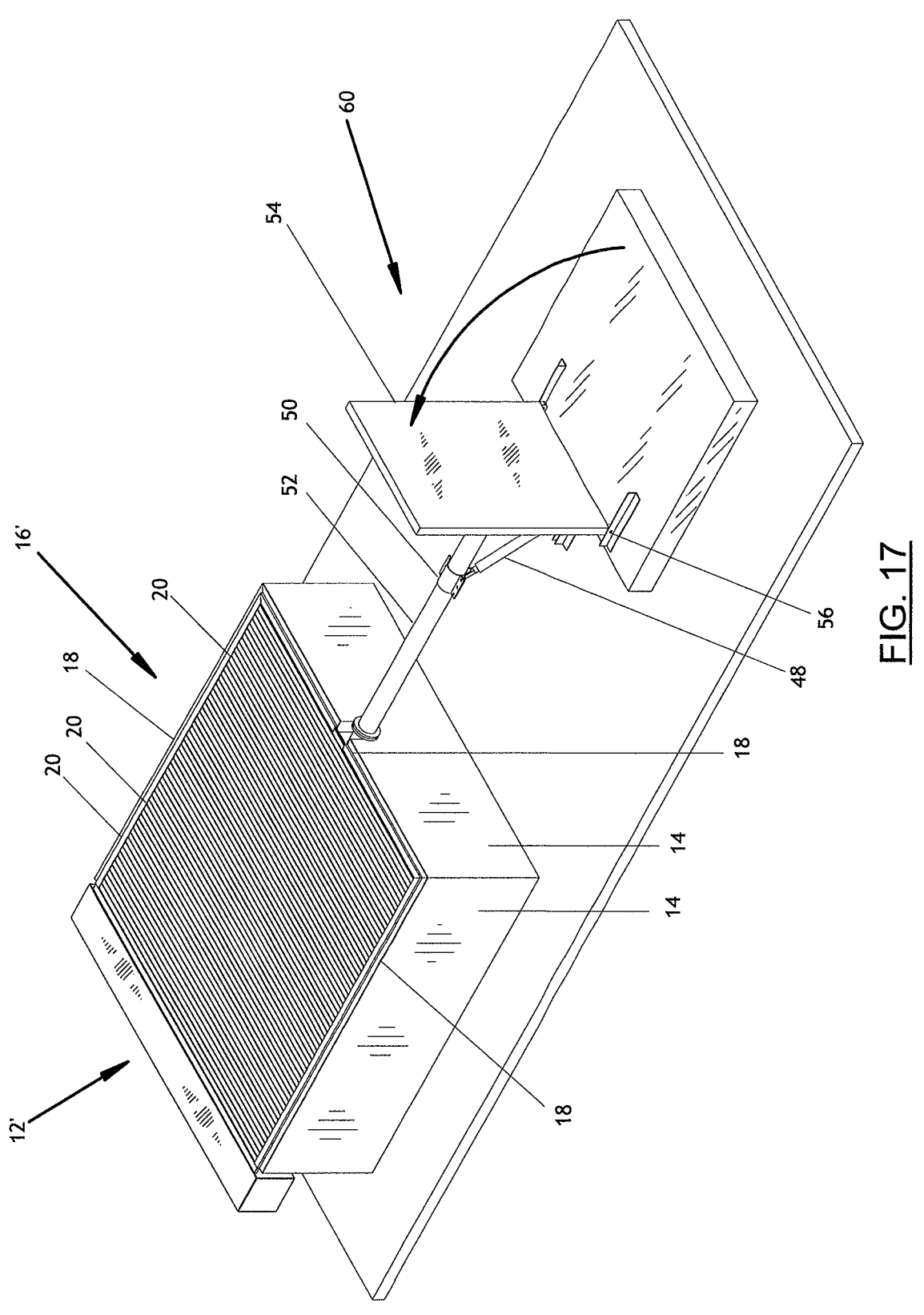
FIG. 17 is another perspective view thereof; here with the tilting, or folding, wind-turbine mast in a horizontal position, the wind turbine now housed within the unit, and the movable door in the 'closed' position.

FIG. 17 is another perspective view thereof; here detailing the tilting mast assembly 60, lowered to a horizontal position, placing the wind turbine 58 (not visible), within the storm resistant containment unit 10', and beneath the movable door 16'.

Figure 18:
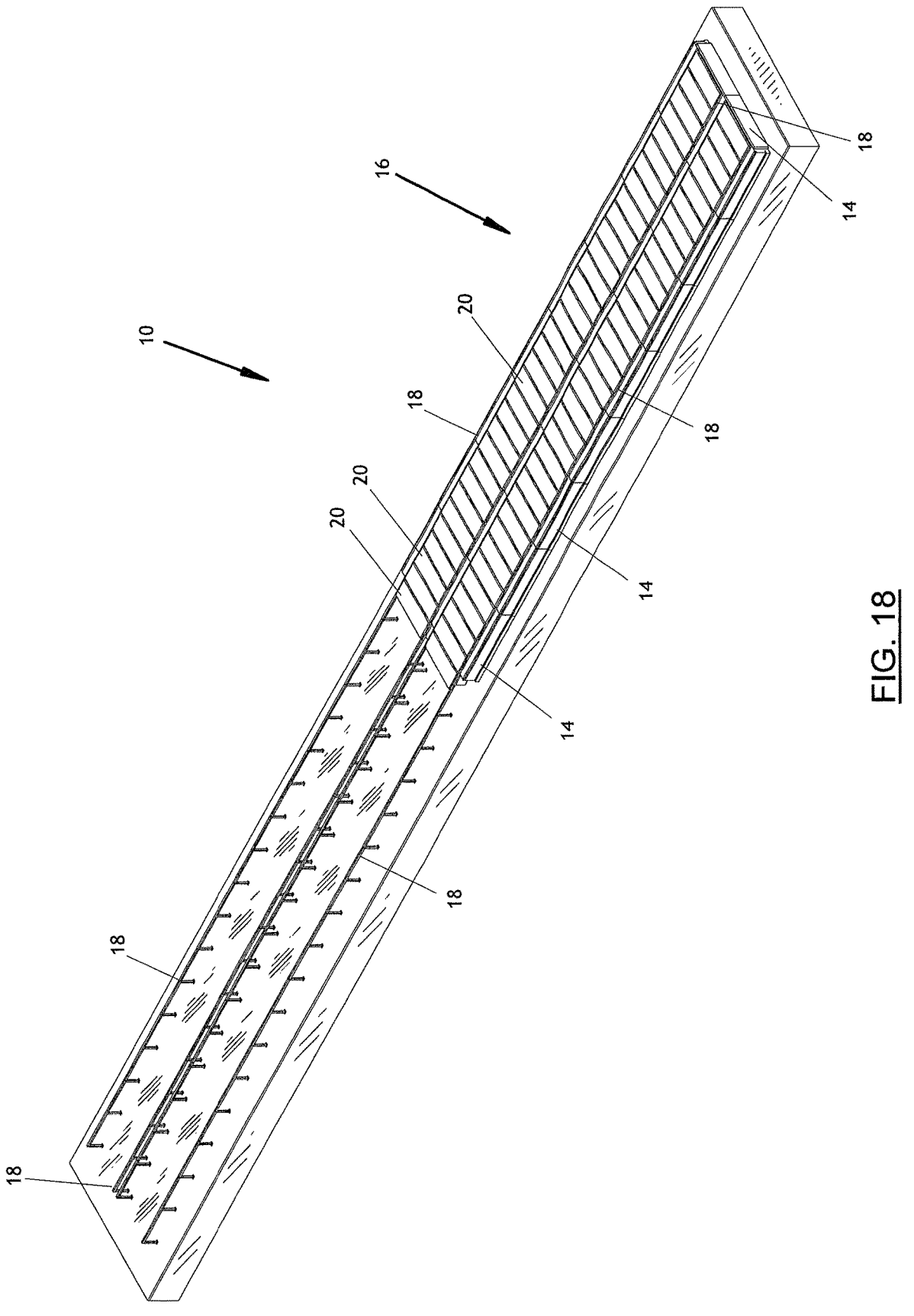
FIG. 18 is a perspective view of two storm resistant containment units, here with movable doors located in the 'closed' position, above a plurality of solar or photovoltaic panels, with door tracks extended beyond one edge of the storm-resistant containment unit, and aligned such that the movable doors may be moved (e.g. rolled) horizontally, according to another embodiment of the invention.

FIG. 18 is a perspective view, here showing two (2) storm resistant containment units 10, comprised of durable side panels 14, door tracks 18, and door panels 20, mechanically hinged to form the movable doors 16, which are laterally and vertically constrained by the door tracks 18, and which are extended at one end, to hold the movable doors 16 when retracted.

Figure 19:
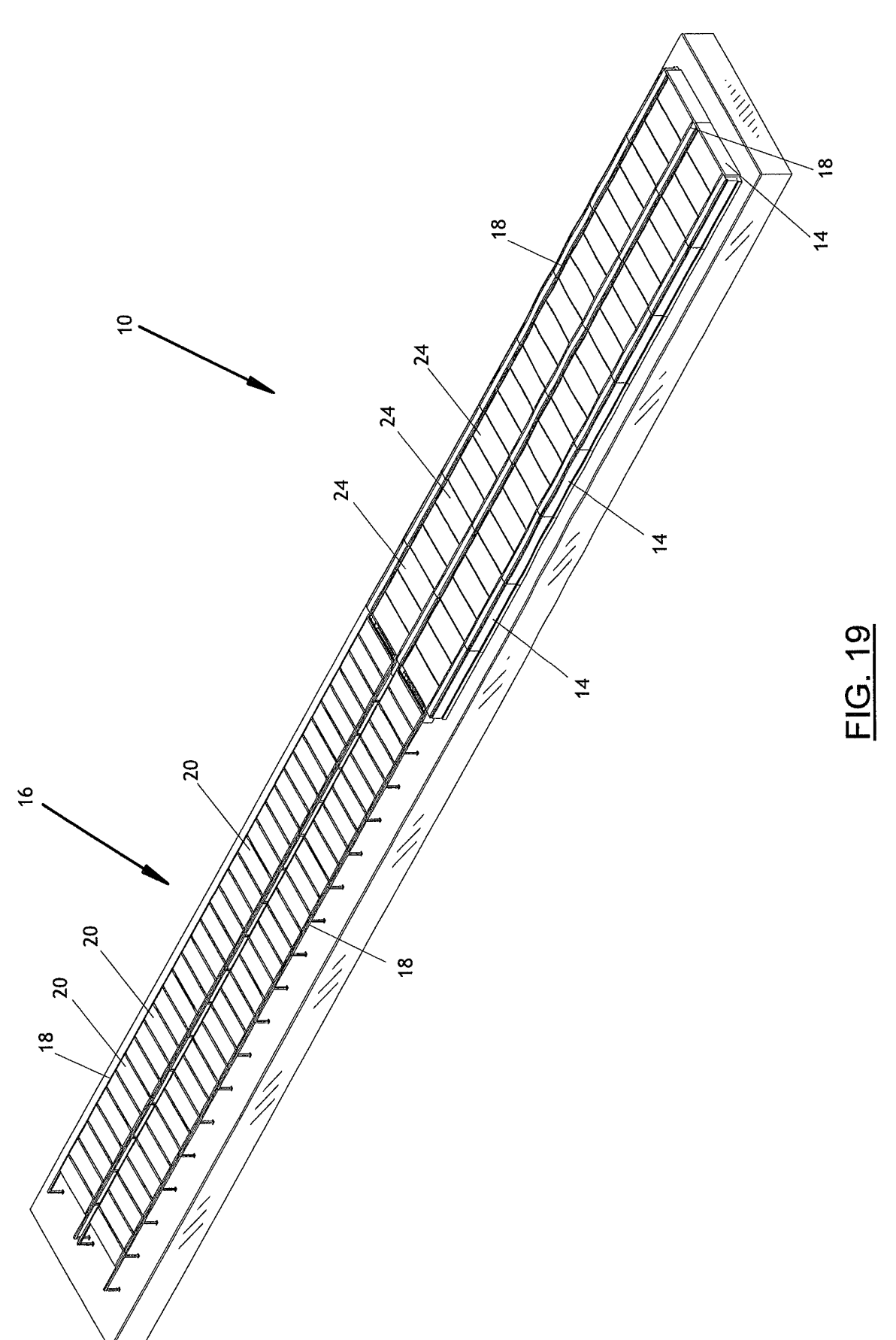
FIG. 19 is another perspective view thereof; here with the movable door moved horizontally, thus exposing the solar or photovoltaic panels, allowing energy collection to begin.

FIG. 19 is another perspective view thereof; here with the movable doors 16 positioned onto the extended door tracks 18, thereby exposing the solar or photovoltaic panels 24, and allowing energy collection to begin.

Figure 20:
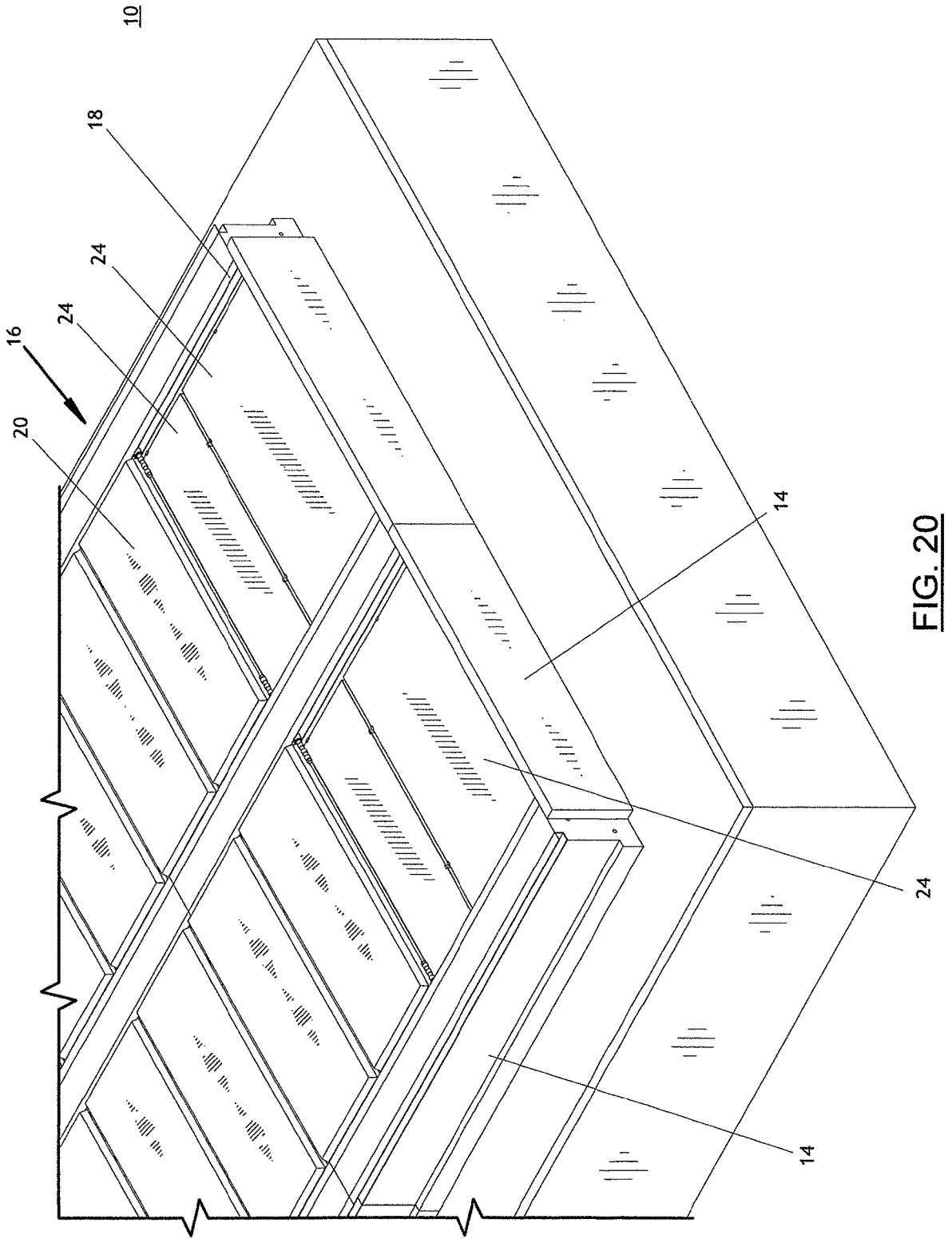
FIG. 20 is a partial perspective view thereof; here revealing the movable door partly retracted, exposing the solar or photovoltaic panels mounted within.

FIG. 20 is a partial perspective view thereof, here showing the movable doors 16 partly opened, revealing the solar or photovoltaic panels 24 which are mounted beneath the movable door 16.

Figure 21:
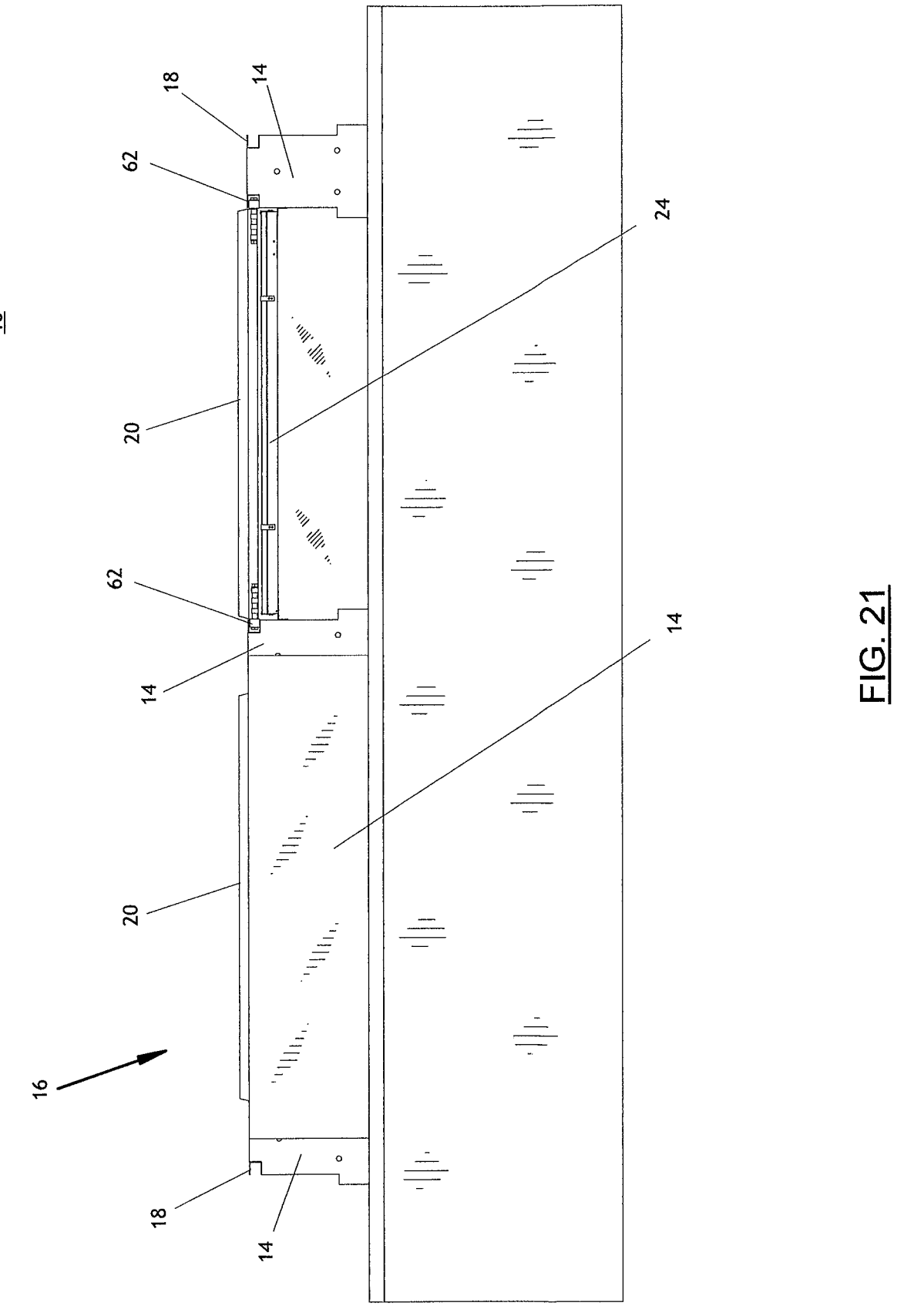
FIG. 21 is an end plan view, here with one side panel removed to reveal the solar or photovoltaic panels mounted beneath, and detailing track wheels attached to the movable door panels.

FIG. 21 is an end plan view thereof, with one side panel 14 removed to reveal the solar or photovoltaic panels 24, located beneath the movable door 16. Also revealed are the track wheels 62, which are attached at the hinge points of the door panels 20, allowing the movable door 16 to be rolled into the open or closed position, as weather conditions dictate.

Figure 22:
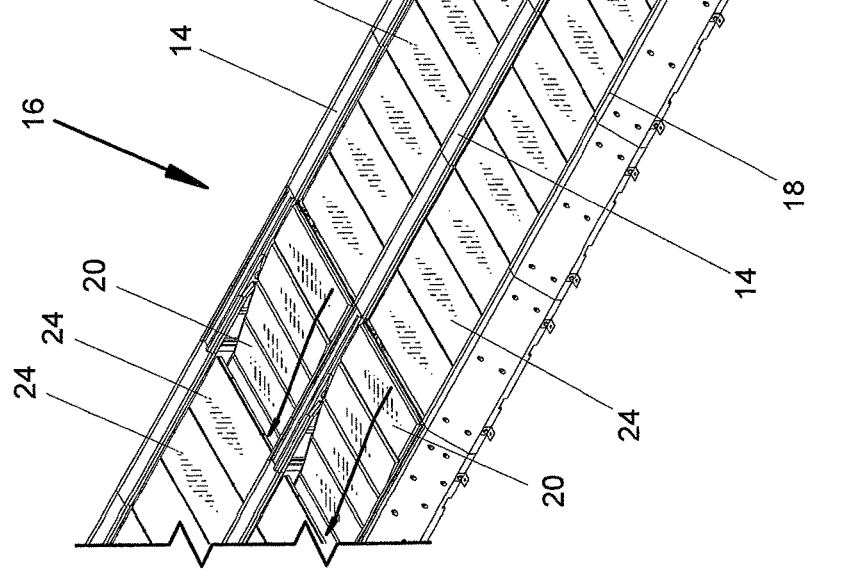
FIG. 22 is a partial perspective view of four (4) storm resistant containment units. Here two (2) storm resistant containment units are in parallel on the right hand side, and two (2) storm resistant containment units are in parallel on the left hand side (partially cut away), and with the drive mechanism cover panel removed, to reveal two (2) movable doors while being positioned beneath the solar or PV Panels of the adjacent, storm resistant containment units.

FIG. 22 is a partial perspective view of four (4) storm resistant containment units 10 with two (2) center door panels 20 removed, to reveal the movable doors 16, of the two (2) storm resistant containment units 10 depicted on the right-hand side, being moved to a position beneath the solar or PV Panels 24 of the two (2) storm resistant containment units 10 depicted on the left-hand side.

Figure 23:
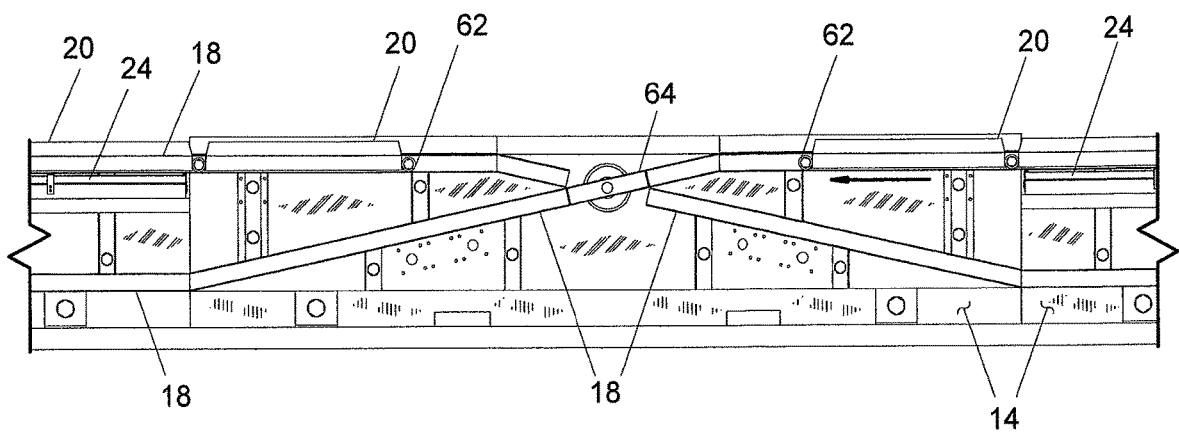
FIG. 23 is a partial side plan view thereof; here with a side panel removed to reveal the upper and lower door tracks of two (or more) abutted storm resistant containment units, the connected string(s) of movable doors or covers, and a track switch, positioned to join the upper door track of one storm resistant containment unit, to the lower door track of the adjacent storm resistant containment unit. In this view, the movable door of each storm resistant containment unit is in the 'Deployed' (e.g. 'Closed') position and the track switch is positioned as required for imminent 'Retraction' (e.g. 'Opened').

FIG. 23 is a partial side plan view thereof, here with one side panel 14 removed, revealing the door tracks 18, movable doors 16, in the 'closed' or 'Deployed' position, constructed of connected movable door panels or covers 20, and a movable track switch member 64, which joins the appropriate door tracks 18 allowing a 'path' to retract the movable door 16 beneath the Solar or PV Panels 24 of the adjacent (abutted) storm resistant containment unit 10. The units 10 are end to end, with tracks for the covers or doors both above and below the solar or PV panels. The track switch member 64 is in between to connect the upper track on one side to the lower track on the other, or vice-versa as indicated in the subsequent figures. In this embodiment, the switch member 64 comprises a section of track mounted on a horizontal axle or other pivot member.

Figure 24:
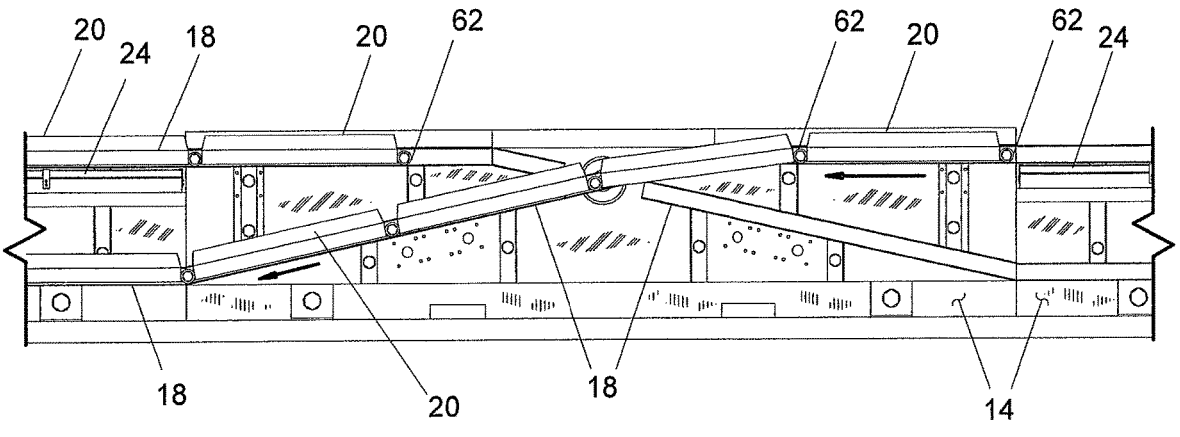
FIG. 24 is another partial side plan view thereof; again with a side panel removed to reveal the upper and lower door tracks of the abutted storm resistant containment units, the connected string of movable doors, and a track switch, positioned to join the upper door track of one storm resistant containment unit, to the lower door track of the adjacent storm resistant containment unit. In this view, the movable door of the right-hand storm resistant containment unit is shown when partially 'Retracted', with a portion of the movable door still positioned on the upper door track of the storm resistant containment unit on the right.

FIG. 24 is another partial side plan view thereof, here with one side panel 14 removed, revealing the door tracks 18 and movable door 16, which is in the process of being moved beneath the Solar or PV Panels 24 of the adjacent (abutted) storm resistant containment unit 10.

Figure 25:
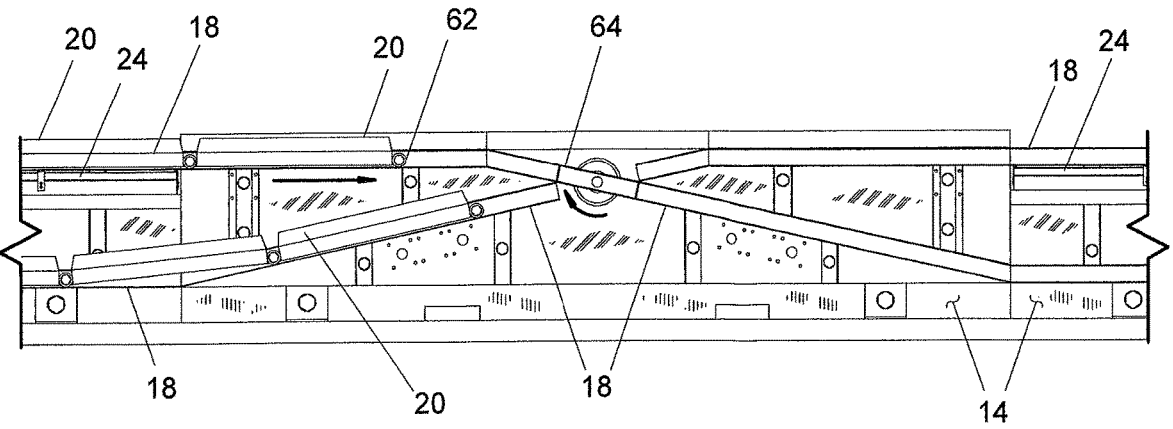
FIG. 25 is another partial side plan view thereof; again with a side panel removed to reveal the upper and lower door tracks of the abutted storm resistant containment units, the connected string of movable doors, and a track switch, positioned to join the upper door track of one storm resistant containment unit, to the lower door track of the adjacent storm resistant containment unit. In this view, the movable door of the right-hand storm resistant containment unit is shown completely 'Retracted' in the lower door track of the adjacent unit, and the track switch has been moved so as to connect the upper door track of the left-hand storm resistant containment unit, to the lower door track of the right-hand storm resistant containment unit.

FIG. 25 is another partial side plan view thereof, here with one side panel 14 removed, revealing the door tracks 18 and a movable door 16, after having been completely moved beneath the Solar or PV Panels 24 of the adjacent (abutted) storm resistant containment unit 10. Also shown is the movable track switch member 64, which has now been re-positioned to join the upper door track 18 of the left-hand storm resistant containment unit 10, to the lower door track 18 of the right hand storm resistant containment unit 10 which will allow the same operational sequence to occur for the movable door 16.

Normally for operation in fair or mild weather, the door panels or covers are positioned on the lower tracks, with the solar or PV panels 24 exposed to the sun. In case of threatening weather or other adverse conditions, the door panels or the movable doors 16 can be brought up from the lower track on one side to cover the PV panels on the other, and then the pitch of the switch member 64 can be reversed to bring the other movable doors 16 up to cover the PV panels 24 on the one side. This operation can be carried out automatically. This system minimizes the extra space that might be needed for the protective covers or doors and their actuating mechanism(s).

A number of advantageous features may be incorporated into the containment unit with movable protective doors or covers for mounting the PV solar panels within.

The containment unit may be formed of metal, or concrete, with pilings, footers or ground anchors; constructed on, driven into, or otherwise secured to the ground, to act as anchoring for the containment unit (FIG. 3, FIG. 6 and FIG. 7). Additional applications may be considered, such as securing the containment unit onto building rooftops, or other permanent structures such as barges or floating platforms or elevated car ports, by use of various attachment means.

Durable, exterior side/end panels may be present as a part of the containment unit (FIG. 1, FIG. 7, FIG. 11 and FIG. 18). Side and end panels may be fabricated from formed steel, structural steel, durable composite materials, formed concrete or other materials, e.g., a technical plastic resin; and used to protect PV Solar panels, and mountings, which may be permanently fixed within said containment unit. Described side and end panels may be designed to have aerodynamic shapes to mitigate the damaging effects of extreme wind conditions.

The durable, flexible 'tracked' door or tambour door (FIG. 1, FIG. 5, FIG. 6, FIG. 18 and FIG. 22) may be actuated (via mechanical, pneumatic, hydraulic or electrical methods) to an 'open' position, allowing sunlight to strike fixed PV Solar panels; OR to a 'closed' position, such that the fixed PV Solar panels (and mounting frames) are completely enclosed within the containment unit, and protected from extreme weather conditions (FIG. 6, and FIG. 13).

Alternatively, the moveable doors of the containment unit may be constructed of solid (rigid) panels (FIG. 11, FIG. 12 and FIG. 15), which may be fabricated from formed steel, structural steel, durable composite materials or formed concrete. These solid panel-type moveable doors may be 'pivoted' to an 'open' position for energy collection (FIG. 12 and FIG. 15); Or 'pivoted' to a 'closed' position, thereby providing protection from the effects of extreme weather (FIG. 11).

The interlocking slats (FIG. 1, FIG. 3, FIG. 4, FIG. 11 and FIG. 17) or tambour components may comprise the structure of the 'tracked' door. The interlocking slats may be constructed of extruded metal, formed metal, concrete or other suitable, durable materials. The interlocking 'slats' are joined in a manner to create the formation of a flexible, 'tracked' door structure, which may be rolled onto a cylinder (FIG. 9), OR may be retracted beneath the fixed PV Solar panels in a 'conveyor belt' shape (FIG. 3 and FIG. 5). Alternatively, an actuator/roller mechanism (mechanical, pneumatic, hydraulic or electrical) to cause the 'opening'/closing' movement of the flexible, 'tracked' door, OR pivoting, solid door panels (FIG. 12 and FIG. 15).

The Inventors envision the 'slats' of said flexible 'tracked' tambour doors (with the 'conveyor belt' shape) may be constructed of highly-reflective materials; Or that highly-reflective coatings may be applied to the 'slats' of said flexible 'tracked' doors, to enhance energy collection when bifacial PV Solar panels are applied.

A mechanized cylinder may be present here to cause/allow the flexible 'tracked' door to be coiled onto the cylinder (FIG. 9 and FIG. 10). Alternatively, motors, cables, chains, wheels, bearings and shafts to allow the flexible door to wind into a 'conveyor belt' shape, beneath or above the PV Solar panels (FIG. 5).

An actuator (mechanical, pneumatic, hydraulic or electrical) may act to move the PV Solar panels to an outward deployed, or inward retracted, fixed position (FIG. 12, FIG. 13 and FIG. 14).

A combination of support frames, shafts, hinges, springs or linkages, may secure the PV solar panels and associated mounting frameworks to the containment unit (FIG. 14), allowing the PV Solar panels to be secured in a fixed, horizontal or angled, position; or to allow the PV Solar panels, and associated mounting frameworks, to be pivoted out of, or retracted into, the containment structure/protective enclosure (FIG. 13, FIG. 14 and FIG. 15).

Control switches may be employed to detect the 'fully closed' or 'fully open' position of the flexible, 'tracked' door; or pivoted door panels. Alarm controls/signals may be applied to notify Service Personnel if a Containment Unit is not fully 'open' or 'closed'.

Manual or Automated controls (located at the Containment Unit, or a centrally-located Control Room) can be used to allow actuation for opening, or closing, of the moveable doors. The inventors envision Artificial Intelligence (AI) controlled applications, where Doppler radar, Wind-speed measurement devices, barometric Pressure measurement devices and other storm prediction means may anticipate extreme weather conditions, and then in response the AI systems (software/algorithms) automatically cause the 'closure' of all Containment Units within a PV Solar energy collection 'field', and subsequently automatically cause re-opening of all Containment Units when weather conditions become favorable.

Manual or automated controls (located at the Containment Unit, or within a centrally-located Control Room) may allow movement of the solar panels, when deployed, to a predetermined fixed position outside of the containment unit for optimal energy collection (FIG. 12, FIG. 14 and FIG. 15), and then retracted back into the Containment Unit enclosure when weather conditions are predicted to be extreme (FIG. 13).

Internal, automated 'washing' systems may be integrated within the Containment Units and used to clear dust, dirt or ice/snow from PV Solar panels to improve energy collection.

The use of this invented Storm-Resistant PV Solar Panel Mounting Method allows for fixed-mounted PV Solar Panels to collect energy when the Containment Unit Moveable Doors have been 'opened' and weather conditions are favorable; AND for these same PV Solar Panels to be completely enclosed/protected from extreme weather conditions when the Containment Unit Moveable Doors have been closed. This method is particularly useful in areas or regions that are frequently subject to extreme weather conditions (active Tornado or Hurricane Zones).

The important features of this arrangement can be summarized as follows:

1. The application of movable doors, composed of a plurality of hinged panels, with the purpose of Opening to allow sunlight to strike Solar or PV Panels located beneath, OR Closing to form a Storm Resistant enclosure around said Solar or PV Panels, as weather conditions dictate.
2. A method to form the movable doors into a continuous loop (e.g. a conveyor belt shape), wrapped around 2 or more roller cylinders, such that the movable doors may be moved to a position above the internally mounted Solar or PV Panels (to provide protection from Severe Weather Conditions), and then moved (i.e. stored) beneath the internally mounted Solar or PV Panels, when weather conditions are favorable, and to allow energy collection to resume.
3. A method to coil, or uncoil, said movable doors onto, or off of, a roller cylinder (alternate embodiment, in preference to the continuous loop method) to achieve the same purposes as claim 2.
4. Solid, rigid Door panels, pivoted along one edge to allow the Solid Door panels to be moved to an Open position, exposing the internally mounted Solar or PV Panels to sunlight, allowing energy collection to begin. The rigid door panels may be moved to a Closed position to protect the internally mounted Solar or PV Panels, from excessive wind, hail and airborne debris, during severe weather conditions.

5. A PV Panel Mounting Frame; hinged or pinned along one edge, such that the opposite edge may be pivoted at said hinges or pins, by various mechanical or electrical means, to improve the sun exposure for Solar or PV Panels, which are mounted upon the Mounting Frame; AND also to allow for the PV Panel Mounting Frame (and connected PV Panels) to be returned to their original internal position when Weather Conditions dictate.

6. A Tilting Mast assembly that allows a wind turbine to be lowered into a Storm Resistant Containment unit, the movable doors of which then Close, thereby providing protection from severe weather conditions. The movable doors may be reopened, and the tilting mast/wind turbine then lifted, when weather conditions allow.

7. A surface affixed, external Track to allow the movable doors to be positioned so as to allow sunlight to strike the internally mounted Solar or PV Panels, and then moved back to a position above the internally mounted Solar or PV Panels, thereby providing protection from severe weather conditions.

8. A Track Switch/mechanism that will allow the temporary joining of various movable door track sections.

9. The various controls/mechanisms that will be used could include motors, limit switches, actuators, bearings, chain/sprocket, belt/pulley, etc. For instance, the track switch in FIGS. 23-25 maybe mechanically moved but detail is omitted here, as many possibilities exist.

Moreover, in each of the described embodiments, a cleaner and wiper mechanism may be incorporated, e.g., along the moving cover such as tracked door 16, for removing dirt and debris from the photovoltaic panels 24, either at scheduled times or when the doors are being closed or opened.

In other embodiments of the invention, wind turbines, applied with 'powered' and 'tilting' (or 'folding') masts, may be lowered into the Storm-Resistant Containment Unit, and the movable door 'closed', again providing protection from storm-related damage. When weather conditions improve, the movable doors may be 'opened', the mast of the wind turbine then moved to a vertical position, and renewable energy production may resume. The energy captured by these storm-resistant, commercially-sized, renewable power generating stations can be directed to energy storage systems, electric vehicle charging stations, 'Point of Use' customers and/or Grid-Connected.

The above and many further features and advantages of this invention would be understood by persons skilled in this field. The scope of this invention is not limited only to the described embodiments, but should be considered as defined in the appended claims.

We claim:

1. Storm-resistant photovoltaic assembly comprising:

a linear array of photo-voltaic solar panels configured in one or more rows extending in a distal-proximal direction;

a storm-resistant containment unit in which said array of solar panels are held and including a base, a pair of side walls extending in said distal-proximal direction, and a pair of end walls, and with a normally-open top side through which solar radiation may enter without obstruction and be incident onto said array of solar panels; and a closable and openable weather-proof cover incorporated into said storm-resistant containment unit and which is movable between a normally open position in which said normally-open top side exposes the solar panels to incident solar radiation and a closed position in which said weather-proof cover closes off said open top side to block extreme wind, hail and wind-borne debris from reaching said array of photo-voltaic solar panels, wherein said weather proof cover is configured as a tambour of interconnected weather-proof slats that extend across said open top between respective track members in said side walls when said said weather-proof cover is in said closed position, and said tambour of weather-proof slats extends between respective track members behind said array of solar panels when the weather-proof cover is in the open position; and wherein said track members on said top side and a space behind said array of solar panels form a folded path so that the the tambour of weather-proof slats lies flat after being moved from one of the open and closed positions to the other.

2. Storm-resistant photovoltaic assembly of claim 1 comprising a tilt-able, or fold-able, mast assembly adapted for mounting a wind turbine thereon, and configured to be folded down and lowered at least in part into said storm-resistant containment unit, such that a movable cover can be closed over the tilt-able mast assembly and wind turbine.

3. Storm-resistant photovoltaic assembly comprising:

a first linear array of solar panels configured in one or more rows extending in a distal-proximal direction;

a second linear array of solar panels configured in one or more rows extending in a distal-proximal direction and arranged such that the first and second arrays are situated end-to-end;

a first storm-resistant containment unit in which said first array of solar panels are held and including a base, a pair of side walls extending in said distal-proximal direction, and a pair of end walls, and with an open top side through which solar radiation maybe incident onto said array of solar panels;

a second storm-resistant containment unit in which said second array of solar panels are held and including a base, a pair of side walls extending in said distal-proximal direction, and a pair of end walls, and with an open top side through which solar radiation maybe incident onto said array of solar panels;

each of said first and second storm-resistant containment units having an upper track above the respective array of solar panels and a second track disposed below such array of solar panels;

first and second covers each configured as a series of interconnected slat members disposed to travel in said upper tracks and said lower tracks such that said covers are adapted to extend across said open top above said solar panels and also in said lower tracks below said solar panels; and a track switch member that is configured such that in a first position the switch member connects the lower track of the first containment unit with the upper track of the second containment unit, and in a second position connects the lower track of the second containment unit with the upper track of the first containment unit.

4. Storm-resistant photovoltaic assembly of claim 3 further comprising at least one wind turbine having a folding or tilting mast assembly adapted to fold down and fit within one of said containment units.

5. The storm-resistant photovoltaic assembly of claim 3, wherein said track switch member includes a track section pivotally mounted on a horizontal pivot.

* * * * *